US009140293B2

(12) United States Patent
Schilz et al.

(10) Patent No.: US 9,140,293 B2
(45) Date of Patent: Sep. 22, 2015

(54) JOINING ELEMENT FOR CONNECTING COMPONENTS

(75) Inventors: Arnold Schilz, Lahnstein (DE); Richard Strupp, Trier (DE); Reiner Weber, Wiltingen (DE)

(73) Assignee: Stabilus GmbH, Koblenz (DE)

( * ) Notice: Subject to any disclaimer, the term of this patent is extended or adjusted under 35 U.S.C. 154(b) by 2322 days.

(21) Appl. No.: 12/008,779

(22) Filed: Jan. 14, 2008

(65) Prior Publication Data

US 2008/0175654 A1     Jul. 24, 2008

(30) Foreign Application Priority Data

Jan. 12, 2007   (DE) .......................... 10 2007 001 945
May 19, 2007   (DE) .......................... 10 2007 023 478

(51) Int. Cl.
| F16C 11/00 | (2006.01) |
| F16C 11/04 | (2006.01) |
| F16B 19/10 | (2006.01) |
| F16B 21/08 | (2006.01) |
| F16B 21/16 | (2006.01) |
| E05F 1/10 | (2006.01) |

(52) U.S. Cl.
CPC ............ *F16C 11/04* (2013.01); *F16B 19/1081* (2013.01); *F16B 21/088* (2013.01); *F16B 21/165* (2013.01); *E05F 1/1091* (2013.01); *E05Y 2201/636* (2013.01); *Y10T 403/32713* (2015.01)

(58) Field of Classification Search
CPC .... F16C 11/04; F16B 19/1081; F16B 21/088; F16B 21/165; Y10T 403/32713; E05Y 2201/636; E05F 1/1091
USPC ................. 403/115, 122–144, 194–195, 201, 403/238–239, 243, 261, 329, 365–372, 403/DIG. 14
See application file for complete search history.

(56) References Cited

U.S. PATENT DOCUMENTS

| 3,776,649 | A |   | 12/1973 | Kemezys |           |
| 3,856,422 | A | * | 12/1974 | Trefry ........................... | 403/122 |
| RE31,635  | E | * | 7/1984  | Smith et al. .................... | 403/144 |
| 4,488,206 | A | * | 12/1984 | Mizusawa ..................... | 362/549 |
| 5,047,904 | A | * | 9/1991  | Vraux ............................ | 362/549 |
| 5,508,896 | A | * | 4/1996  | Suehiro et al. ................ | 362/460 |
| 5,908,239 | A | * | 6/1999  | Sugimoto ..................... | 362/528 |
| 6,206,604 | B1| * | 3/2001  | Dembowsky et al. ........ | 403/135 |
| 6,305,725 | B1| * | 10/2001 | Antonucci et al. ............. | 292/67  |

(Continued)

FOREIGN PATENT DOCUMENTS

| CN | 2377742  | 5/2000 |
| DE | 29804345 | 6/1998 |

(Continued)

OTHER PUBLICATIONS

Korean Office Action dated Sep. 27, 2010.

*Primary Examiner* — Victor MacArthur
(74) *Attorney, Agent, or Firm* — Cozen O'Connor

(57) ABSTRACT

A joining element for connecting a first component to a second component, wherein the joining element includes a connection member for the pivotable mounting of the first component, and part of the connection member is receivable in at least one aperture of the second component in a predetermined orientation. A fixing mechanism is provided for directly fixing the connection member to the second component when the part of the connection member received in the aperture.

23 Claims, 39 Drawing Sheets

(56) References Cited

U.S. PATENT DOCUMENTS

| | | | |
|---|---|---|---|
| 6,837,716 B1 * | 1/2005 | Brazas | 439/8 |
| 7,351,001 B1 * | 4/2008 | O'Brien et al. | 403/397 |
| 7,396,183 B2 | 7/2008 | Dona Contero et al. | |
| 7,681,755 B2 * | 3/2010 | Roesler | 220/788 |
| 2005/0120689 A1 | 6/2005 | Kentner et al. | |
| 2006/0251471 A1 | 11/2006 | Chen et al. | |
| 2007/0031185 A1 | 2/2007 | Bertram et al. | |

FOREIGN PATENT DOCUMENTS

| | | |
|---|---|---|
| DE | 10156987 | 6/2003 |
| DE | 10214695 | 10/2003 |
| DE | 202005011420 | 11/2005 |
| DE | 10 2004 042 906 | 3/2006 |
| JP | 8-00330 | 1/1996 |
| JP | 2002357257 | 6/2001 |

* cited by examiner

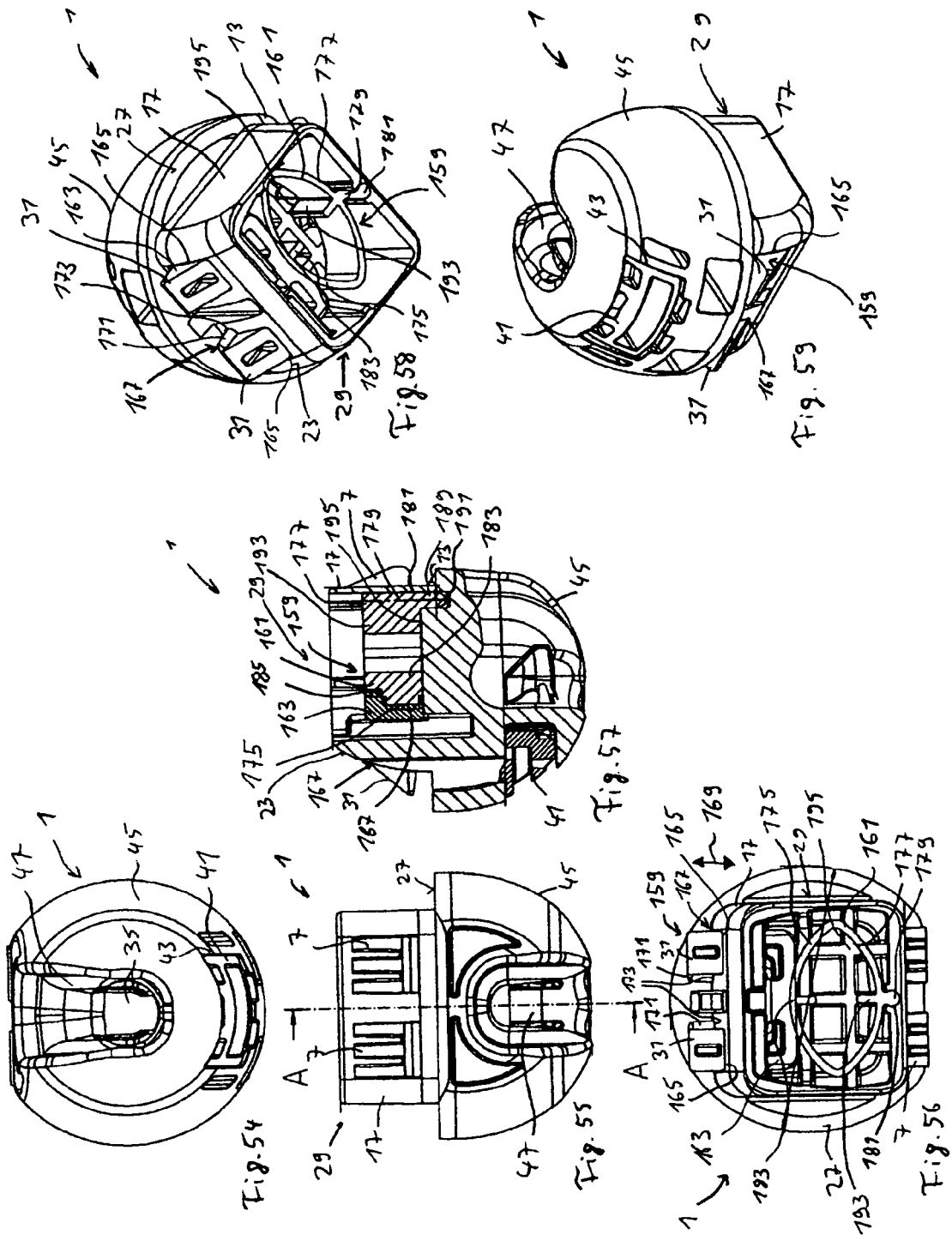

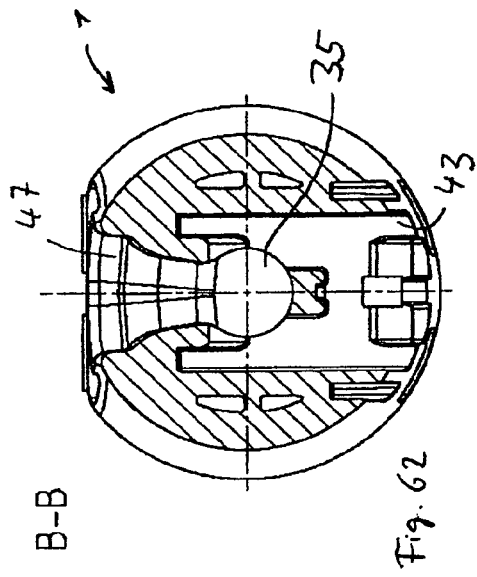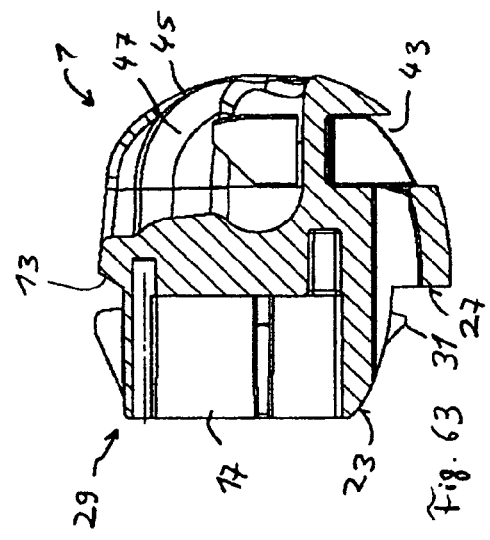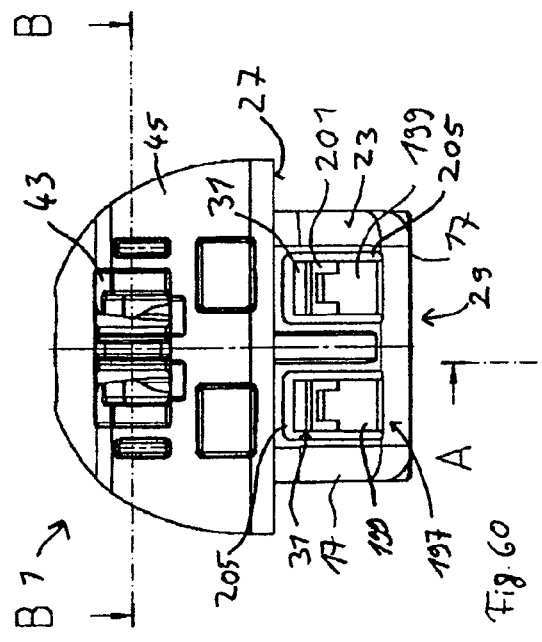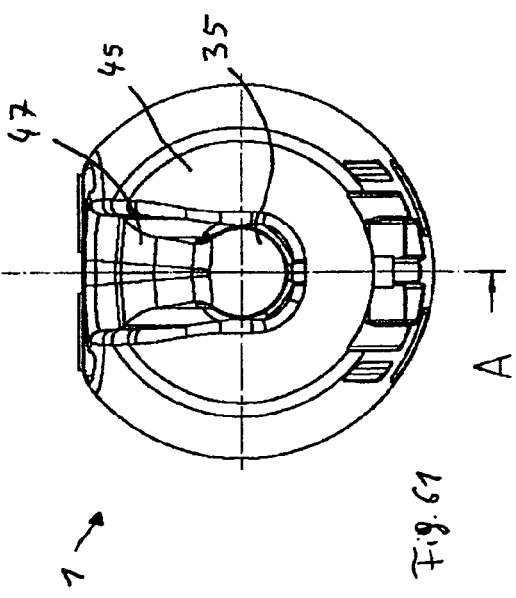

JOINING ELEMENT FOR CONNECTING COMPONENTS

BACKGROUND OF THE INVENTION

1. Field of the Invention

The invention relates to a joining element for connecting a first component to a second component.

2. Description of the Related Art

Devices for connecting components are known. They serve for fitting and fixing the components to each other. DE 10 2004 042 906 A1 shows a device for connecting a component of an adjusting mechanism of a motor vehicle to a fastening plate.

SUMMARY OF THE INVENTION

It is an object of the invention to provide an improved component connection, in particular a component connection which can be fitted and removed more simply and/or more economically.

The object is achieved by a joining element having a pivot bearing for the pivotable mounting of the first component and a connection for the direct fixing of the joining element on the second component. A joining element of this type can therefore advantageously provide a direct connection to the second component without further components. An advantage in this regard is that no further joining elements, such as fixing means, screws and/or the like are therefore necessary. In the case of motor vehicles, flaps, for example an engine bonnet, can be connected to gas-filled spring applications for power assistance. In this regard, the joining element can advantageously be used for the pivotable mounting of the gas-filled spring application and at the same time for the connection thereof directly to the flap and/or to the car body. Further components, such as, for example, angle plates and/or specially manufactured holders, are advantageously not necessary. In addition, the gas-filled spring application can also be connected directly to the motor vehicle body in the same manner, i.e. without additional parts and can be mounted pivotably, for example by means of a joining element of this type. The joining element permits a simple structure and fitting, i.e. an overall economical fastening technique which manages without further additional parts. The pivot bearing of the joining element can advantageously permit cardanic mobility of the first component, for example in order to permit an opening and closing movement of the flap and/or in order to compensate for tolerances. For this purpose, it is possible, for example, at least in some regions for the pivot bearing to compensate for laterally introduced movements. The joining element can advantageously be designed structurally so as to absorb correspondingly occurring loads. The omission of further components advantageously also results in an overall lower weight. The omission of further components, in particular in the front region of a motor vehicle equipped therewith, enables the passive pedestrian impact protection to also be improved by the joining element. In addition, for this purpose the latter may have a round surface with a harmonic profile and/or may be deformable within certain limits.

In a preferred exemplary embodiment of the joining element, the connection can be at least partially inserted into at least one aperture of the second component. In order to fit the joining element, the connection can be inserted into the aperture in a simple manner.

A further preferred exemplary embodiment of the joining element is distinguished in that the connection has a fixing mechanism which can be fixed in the at least one aperture of the second component. The joining element can therefore be fixed on the second component by means of the fixing mechanism of the connection.

A further preferred exemplary embodiment of the joining element is distinguished in that the connection has an aligning mechanism for aligning the joining element relative to the second component. Therefore, with the aid of the aligning mechanism, the desired exact position of the joining element relative to the second component can be obtained and/or set, for example even as it is being fitted. The aligning mechanism can advantageously be designed in such a manner that the correct position is set automatically during fitting and/or afterwards, for example by means of a form-fitting connection.

A further preferred exemplary embodiment of the joining element is distinguished in that the pivot bearing together with a ball socket is designed as a ball-and-socket joint for fixing and mounting a ball of the first component and/or of the joining element. The first component and/or the joining element can therefore have a ball which is mounted pivotably in a corresponding ball socket. For this purpose, it is conceivable for the ball to be pivotable within certain limits in at least one direction in space and, in addition, in any other desired directions in space. The joining element can therefore be used to produce a spatial pivot mounting, which is known from ball-and-socket joints, between the first component and the second component which is connected thereto via the joining element.

A further preferred exemplary embodiment of the joining element is distinguished in that the pivot bearing has a clamp, which can be pushed into the joining element, for fixing the ball in the ball socket. In order to fit the first component to the joining element, the ball can advantageously first of all be placed into the socket. In order to fix the ball in the corresponding ball socket of the joining element, the clamp can then be pushed into the joining element in such a manner that the clamp engages around a ball neck of the ball-and-socket joint and consequently holds and fixes the ball in the ball socket. For removal, for example in order to carry out maintenance work on the first component and/or in order to exchange the first component, the fixing of the ball in the ball socket can be released again by simple removal of the clamp from the joining element.

A further preferred exemplary embodiment of the joining element is distinguished in that the joining element has a bearing surface for placing it onto the second component in a planar manner. The bearing surface can advantageously serve as a stop. It is thus possible, for example, to insert the joining element or the connection of the joining element into the aperture of the second component until the bearing surface of the joining element bears against the second component in a planar manner, preferably against the edge of the aperture in a planar manner.

A further preferred exemplary embodiment of the joining element is distinguished in that the connection has a base. In order to fit the joining element, the base of the connection can be inserted into the corresponding aperture of the second component.

A further preferred exemplary embodiment of the joining element is distinguished in that the base is of essentially rectangular design and can be inserted into an essentially rectangular aperture of the second component. The second component therefore has an essentially rectangular aperture matched to the outer shape of the base. Consequently, a particularly good, accurately fitting connection of the joining element to the second component is produced.

A further preferred exemplary embodiment of the joining element is distinguished in that, to align the joining element, the base can be inserted into the rectangular aperture in a form-fitting manner. It is therefore possible to match the base as accurately as possible to the shape of the rectangular aperture, and consequently to bring the base into bearing contact with the edge of the rectangular aperture even as it is being fitted. As a result, even as the joining element is being fitted to the second component, an alignment, which takes place more or less automatically, of the joining element relative to the second component can take place in a simple manner and is then maintained in the fitted state.

A further preferred exemplary embodiment of the joining element is distinguished in that the base has a fixed latch on a first side and a latching mechanism on a second side lying opposite the latch. The latch can advantageously engage in the rectangular aperture of the second component in such a manner that the connection of the joining element is interlocked there. In addition, that side of the joining element which lies opposite the latch can be latched to the rectangular aperture with the aid of the latching mechanism. Consequently, by means of the fixed latch and the latching mechanism, the joining element or the connection of the joining element is therefore fixed in the rectangular aperture of the second component in a form-fitting manner. Overall, the form-fitting fixing is produced by the shape of the base, the latch, the latching mechanism and the stop surface, thus resulting in a form-fitting fixing in all directions in space.

A further preferred exemplary embodiment of the joining element is distinguished in that the latching mechanism has two latching lugs arranged next to each other, a latching slide with the two latching lugs, a sliding bearing for the mounting of the latching slide, and/or a spring element, which is assigned to the latching slide, for resetting the latching slide. The two latching lugs can each be effective separately in order to improve or increase the latching forces. As an alternative, just one or more than two latching lugs may also be provided. The latching lugs can advantageously be displaced in a manner guided by the latching slide. In this case, after or during latching of the latching lugs into a corresponding counter bearing, the latching slide can be displaced by a spring force, which is applied by the spring element, in such a manner that the latching lugs move into a latching position, i.e. are in engagement with the counter bearing, and are consequently latched thereto.

A further preferred exemplary embodiment of the joining element is distinguished in that that side of the base which lies opposite the latch has a curved sliding surface. In order to fit the joining element to the second component, it is therefore possible first of all to interlock the latch in the rectangular aperture in order, subsequently, to pivot the entire joining element about a pivot axis in the vicinity of the fixed latch fully into the aperture. In this case, the curved sliding surface can be placed onto an edge of the rectangular aperture, thus resulting in an automatic alignment of the joining element in the aperture. The base can therefore be supported on the recess via the sliding surface during fitting. The rectangular design of the base makes it possible to prevent the joining element from being fitted wrongly. However, in order to permit fitting in all directions, it is also possible to design the base to be essentially square. Furthermore, it is conceivable, in order always to prevent erroneous fitting, to provide the base in a, for example, slightly conical shape deviating from the rectangular shape.

A further preferred exemplary embodiment of the joining element is distinguished in that the connection has an aligning pin for aligning the joining element relative to the second component, the aligning pin being insertable into an aligning hole of the second component. A desired position of the joining element relative to the second component can advantageously be produced via the aligning pin in the aligning hole.

A further preferred exemplary embodiment of the joining element is distinguished in that the connection has at least one expanding mechanism and at least one associated fixing stem. The at least one expanding mechanism is insertable into at least one fixing hole of the second component and is fixable there in a form-fitting and/or frictional manner by means of the fixing stem. Therefore, in order to fit the joining element, first of all the at least one expanding mechanism can be inserted into the associated fixing hole of the second component. In addition, the desired, exact positioning can be produced at the same time by means of the aligning pin in the aligning hole. After that, the form-fitting and/or frictional connection of the joining element to the second component can take place in a simple manner, for example by simply knocking the associated fixing stem into the mechanism.

A further preferred exemplary embodiment of the joining element is distinguished in that the connection has a sliding bearing for the sliding mounting of the joining element relative to the second component. The sliding bearing can support the joining element in a sliding manner on the second component during the fitting.

A further preferred exemplary embodiment of the joining element is distinguished in that the sliding bearing has two sliding shoes which can each be inserted in a tapering slot of the second component. Therefore, for the fitting, the sliding shoes of the connection of the joining element can first of all be inserted into the tapering slots of the second component.

A further preferred exemplary embodiment of the joining element is distinguished in that the connection has at least one latching peg which can engage in a latching aperture of the second component in order to block the sliding bearing. The joining element can therefore advantageously be displaced along the sliding bearing relative to the second component until the latching pegs latch into the latching apertures, i.e. the sliding bearing is blocked as a result. When the sliding bearing is blocked, a form-fitting fixing of the joining element on the second component is therefore produced.

A further preferred exemplary embodiment of the joining element is distinguished in that the connection has at least one clip which can be inserted into a clip hole of the second component, in particular two clips and two aligning pins. The joining element can be positioned relative to the second component by means of the aligning pins. The clips can latch into the associated clip holes and can thus bring about a form-fitting fixing of the joining element together with the aligning pins.

A further preferred exemplary embodiment of the joining element is distinguished in that the at least one clip can be connected to the joining element in a form-fitting manner. The clip can be advantageously, for example, a standardized clip with a standardized connection. Before the joining element is fitted to the second component, the joining element or the connection of the joining element can then first of all be equipped with the clip or the clips.

A further preferred exemplary embodiment of the joining element is distinguished in that the connection has at least one fixed expanding stem which can be inserted via a separate expanding mechanism into a corresponding fixing hole of the second component in a form-fitting and/or frictional manner. In this case, the expanding mechanism can be designed in such a manner that, as soon as it protrudes sufficiently far into the fixing mechanism, it is automatically supported on the second component or on the edge of the fixing hole of the second component during the fitting of the joining element. As a result, the joining element or the expanding stem connected fixedly thereto can be inserted in accordance with the fitting movement direction into the expanding mechanism fastened to the second component, as a result of which the system is automatically clamped, i.e. the form-fitting and/or frictional connection of the expanding mechanism in the fixing hole and to the expanding stem is/are produced.

A further preferred exemplary embodiment of the joining element is distinguished in that the connection has a gripping shoe for engaging in a gripping recess of the second component. The gripping shoe can advantageously engage in the gripping recess of the second component in such a manner that the joining element is fixed in the gripping recess. For this purpose, the joining element can first of all be brought at a certain angle close to the second component such that the gripping shoe engages in the gripping recess.

A further preferred exemplary embodiment of the joining element is distinguished in that the connection has a clip, which is arranged such that it lies opposite the gripping shoe, for clipping into a clip recess of the second component. The clip can advantageously produce a form-fitting latching connection of the joining element to the second component. For the fitting, after the gripping shoe is threaded into the gripping recess, the joining element can be pivoted about a pivot axis close to the gripping shoe such that the clip is automatically inserted by the pivoting movement into the associated clip recess of the second component where it finally latches in place.

A further preferred exemplary embodiment of the joining element is distinguished in that the connection has at least one aligning peg for aligning the joining element in a corresponding aligning recess of the second component. The aligning peg can advantageously likewise be inserted into the corresponding aligning recess during the pivoting movement, i.e., during the fitting, can automatically ensure that the joining element is correctly aligned relative to the second component. For this purpose, the aligning peg can have corresponding sliding surfaces which can slide along an edge of the aligning recess of the second component in such a manner that the desired alignment of the joining element is automatically established.

A further preferred exemplary embodiment of the joining element is distinguished in that the connection has a base for inserting into base aperture of the second component. The base can advantageously be matched to the shape of the aperture. In addition, the base can guide a linear pushing-in movement of the joining element into the aperture of the second component. The base together with the stop surface can also bring about a correct alignment or positioning relative to the second component.

A further preferred exemplary embodiment of the joining element is distinguished in that the base has at least one latching tongue. The latching tongue of the base can advantageously latch in place on the edge of the base aperture in such a manner that the latching forces counteract the linear fitting movement, i.e. the joining element is fixed in a form-fitting manner on the second component by the latching tongue counter to the fitting direction.

A further preferred exemplary embodiment of the joining element is distinguished in that the base has a spring ring with at least one locking catch. Consequently, the base can be latched on the base aperture with the aid of the locking catch, with the spring forces of the spring ring keeping the locking catch in a closed position such that the base of the joining element is connected in a form-fitting manner to the second component via the locking catch counter to the linear fitting direction.

A further preferred exemplary embodiment of the joining element is distinguished in that the latching mechanism is designed integrally or as a single piece with the rest of the joining element. The joining element advantageously has fewer individual parts and, as a result, can be manufactured in one step, for example as an injection-molded part.

A further preferred exemplary embodiment of the joining element is distinguished in that the latching, mechanism is designed integrally or as a single piece with the base. The base and the latching mechanism can be manufactured as a separate part in a single step. The base may optionally also be connected as a single piece to the rest of the joining element.

A further preferred exemplary embodiment of the joining element is distinguished in that the latching lugs are designed integrally or as a single piece with the rest of the joining element. The functional elements, the latching lugs, can advantageously be connected as a single piece to the rest of the joining element. A separate adjustment and/or fitting is not necessary.

A further preferred exemplary embodiment of the joining element is distinguished in that the latching lugs of the latching mechanism each have a resilient material joint and are each assigned integrally or as a single piece to the rest of the joining element via the material joint. The material joint can advantageously be produced as a single piece from the material of the joining element, for example by injection moulding. The material joint can have resilient properties in order to ensure the latching function of the latching lugs connected thereto. In order to obtain a desired spring characteristic, the dimensioning of the material joint and the material of the joining element can be selected or set appropriately.

A further preferred exemplary embodiment of the joining element is distinguished in that the latching mechanism has stops for limiting the compression travel. Undesirable damage to the latching mechanism can be avoided by limiting the compression travel.

A further preferred exemplary embodiment of the joining element is distinguished in that the stops each have a rib. The rib can advantageously serve as a lever and for introducing force for unlocking purposes.

A further preferred exemplary embodiment of the joining element is distinguished in that the joining element has counter stops for the stops. The counter stops can strike against the counter stops for reducing the compression travel of the latching mechanism.

A further preferred exemplary embodiment of the joining element is distinguished in that the counter stops each have a pin, each of the stops being assigned one of the pins. The pins can advantageously be produced in a simple manner as integral parts of the joining element, for example by injection molding.

A further preferred exemplary embodiment of the joining element is distinguished in that, during a compression movement of the latching lugs of the joining element, the ribs strike against the pins. The force flux for limiting the compression travel can take place via the ribs and the pins.

A further preferred exemplary embodiment of the joining element is distinguished in that the material joints of the latching mechanism have predetermined breaking points which permit destructive over-pressing of the latching lugs. For removal in a specific and rapid manner and not without destruction, the latching lugs and the pins and can simply be squeezed off. The latching connection can therefore advantageously be released permanently without a further application of force being necessary.

A further preferred exemplary embodiment of the joining element is distinguished in that the joining element has an actuating device for unlocking the latching mechanism. The joining element can be prepared for removal by means of the actuating device by unlocking of the latching mechanism.

A further preferred exemplary embodiment of the joining element is distinguished in that the actuating device has at least one actuating recess through which an unlocking of the latching mechanism is possible. The at least one actuating recess can permit access to the latching lugs of the latching mechanism directly or indirectly.

A further preferred exemplary embodiment of the joining element is distinguished in that the actuating device has a central actuating recess into which a stick for unlocking the latching mechanism can be inserted. Insertion of the stick enables the latching mechanism to be unlocked in a simple manner.

The object is also achieved by a component assembly with a first, bar-shaped component and a second, planar component in that the first and second components are connected via a joining element, with the joining element being designed in accordance with the joining element described above. The bar-shaped component can therefore be connected to the second, planar component in accordance with the advantages mentioned above.

A preferred exemplary embodiment of the component assembly is distinguished in that the first component is a piston/cylinder unit. It is therefore possible to connect the piston/cylinder unit to the planar component in a manner mounted pivotably corresponding to the ball-and-socket joint.

A further preferred exemplary embodiment of the component assembly is distinguished in that the first component is a gas-filled spring. By means of the gas-filled spring, forces can advantageously be transmitted to the second component via the joining element.

A further preferred exemplary embodiment of the component assembly is distinguished in that the second component is part of a motor vehicle. Consequently, the bar-shaped component can be connected to the motor vehicle via the joining element.

A further preferred exemplary embodiment of the component assembly is distinguished in that the second component is a flap, in particular an engine bonnet, a sheet-metal part and/or the motor vehicle body. It is therefore advantageously possible to connect the bar-shaped component to the motor vehicle, for example for power assistance during opening and/or closing of the flap of the motor vehicle. For this purpose, it is possible to equip the bar-shaped component with two joining elements, i.e., for example, to assign it firstly to the vehicle body and secondly to the motor vehicle flap.

A further preferred exemplary embodiment of the component assembly is distinguished in that the second component is mounted pivotably on the motor vehicle body. The pivotably mounted, second component can be, for example, the motor vehicle flap.

A further preferred exemplary embodiment of the component assembly is distinguished in that the first component has two of the joining elements. As a result, the first component, designed as a guide rod or as a gas-filled spring, can advantageously serve as power assistance, for example for a movement of the flap of the motor vehicle. In this case, the first component is therefore connected to the second component and to a further, third component analogously to the second component, i.e., for example, to the flap mounted on the body and to the motor vehicle body itself.

The object is also achieved by a motor vehicle in that the latter has a component assembly as described above.

The object is also achieved by a method for connecting two components to a joining element by the following steps: introducing the connection of the joining element into the aperture of the second component, and fixing the connection on the aperture. For the fitting, the joining element can therefore be introduced in a simple manner into the aperture of the second component and can subsequently be fixed on the aperture. The result is particularly simple fitting and/or connection of the first and second components.

A preferred exemplary embodiment of the method is characterized by the following step: fixing the first component on the joining element. The first component can advantageously already be fixed on the joining element either before or after the fitting of the joining element.

A further preferred exemplary embodiment of the method is distinguished by the following step: fixing the first component on the joining element by inserting the ball of the first component into the pivot bearing and pushing in the clamp. The connection between the first component and the joining element can therefore take place by means of just two steps. The connection can advantageously be released again by simply pulling out the clamp.

A further preferred exemplary embodiment of the method is distinguished by the following step: placing the connection onto the second component. By placing the connection onto the second component during the fitting, the joining element can advantageously be positioned correctly relative to the second component.

A further preferred exemplary embodiment of the method is distinguished by the following step: screwing in or pushing in the connection and/or latching the connection to the second component. The fitting of the joining element can be completed in a simple manner by this step, with a form-fitting connection of the joining element to the second component being produced automatically.

The object is also achieved by a method for releasing two components from a joining element by the following steps: actuating the actuating device for releasing the connection of the joining element at the aperture of the second component and taking the connection out of the aperture. The release and taking of it out can advantageously take place in a destruction-free manner.

A preferred exemplary embodiment of the method is characterized by the following step: actuating the actuating device to unlock the latching mechanism. The latching connection between the second component and the joining element can be released.

A further preferred exemplary embodiment of the method is characterized by the following step: actuating the actuating device with a stick. The stick can be inserted as a simple auxiliary tool in order to unlock the latching connection.

Further advantages, features and details of the invention emerge from the description below in which various exemplary embodiments are described in detail with reference to the drawing. Identical, similar and/or functionally identical parts are provided with the same reference numbers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 54 is a plan view of a further joining element with an inserted latching mechanism with a spring element;

FIG. 55 is a front view of the joining element shown in FIG. 54;

FIG. 56 is a bottom view of the joining element shown in FIGS. 54 and 55;

FIG. 57 is a longitudinal section of the joining element shown in FIGS. 54 to 56, along the line A-A in FIG. 55;

FIGS. 58 and 59 are perspective views of the joining element shown in FIGS. 54 to 57, from below and above;

FIG. 60 is a rear view of a further joining element with an integrated latching mechanism with a material joint;

FIG. 61 is a plan view of the joining element shown in FIG. 60;

FIG. 62 is a cross section of the joining element shown in FIGS. 60 and 61, along the line B-B in FIG. 60;

FIG. 63 is a longitudinal, section of the joining element shown in FIGS. 60 to 62, along the line A-A in FIG. 61;

DETAILED DESCRIPTION OF THE PRESENTLY PREFERRED EMBODIMENTS

Figure 3:
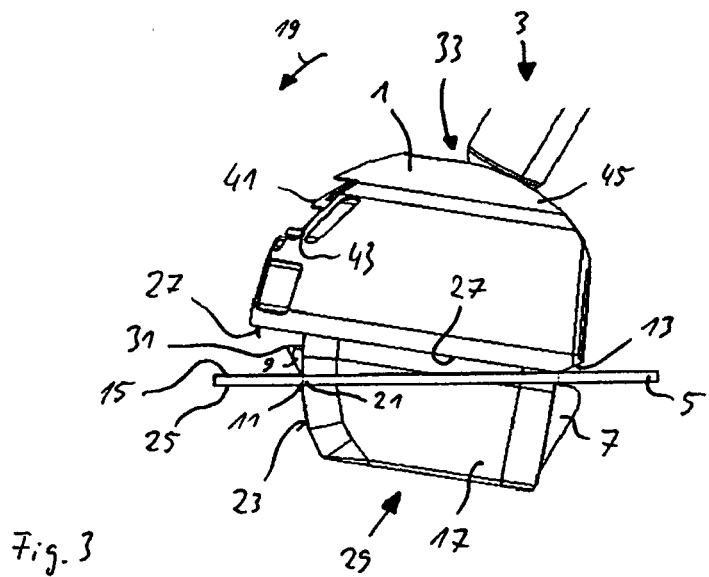
Figure 4:
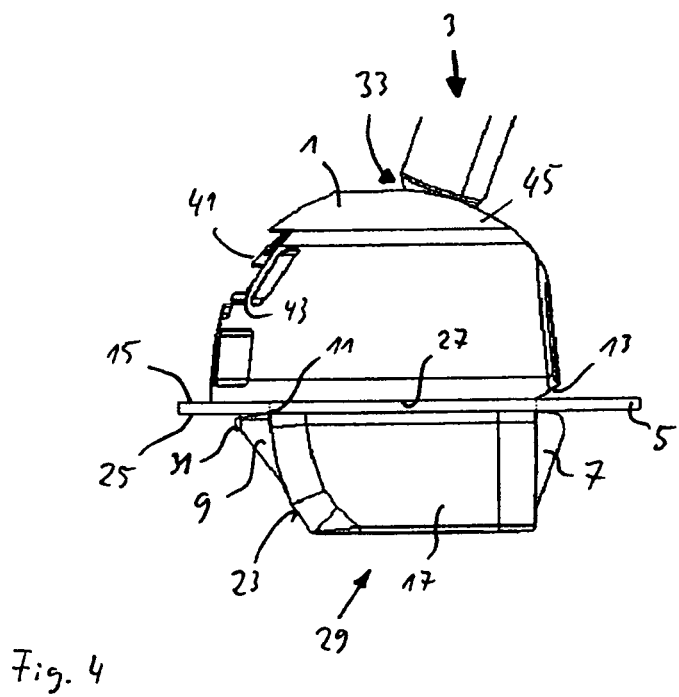
Figure 5:
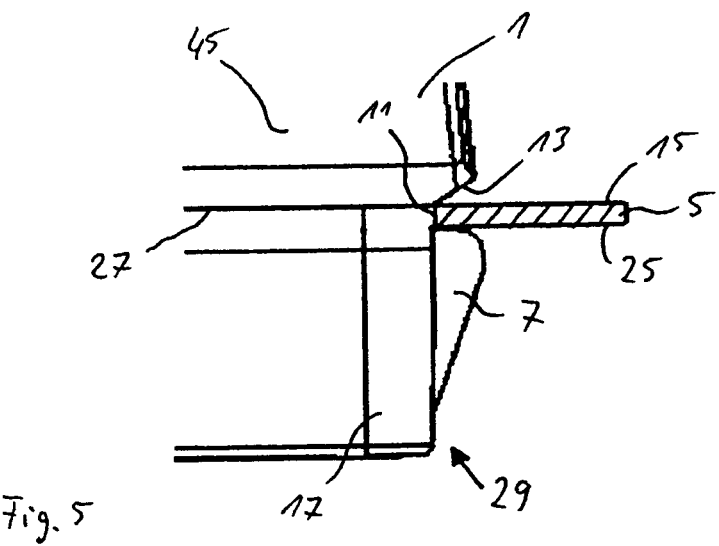
FIG. 5 is a view of a detail of a fixed latch of the joining element illustrated in FIG. 4.
Figure 6:
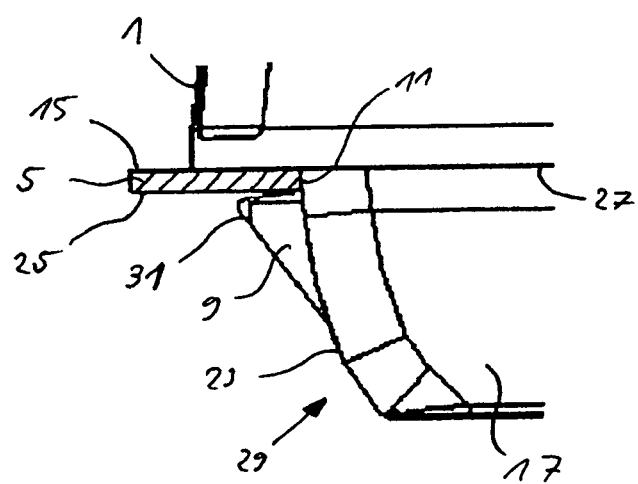
FIG. 6 is a view of a detail of a latching mechanism, which is in engagement with the second component, of the joining element shown in FIG. 4.

FIGS. 1 to 4 are side views of a joining element 1 together with a first component 3 and a second component 5. FIGS. 1 to 4 show various fitting stages of the joining element 1 to the second component 5. FIG. 5 shows a view of a detail of the joining element 1 shown in FIG. 4, with a fixed latch 7. FIG. 6 shows a further view of a detail of the joining element 1 shown in FIG. 4, with a latching mechanism 9 which is latched to the second component 5.

Figure 1:
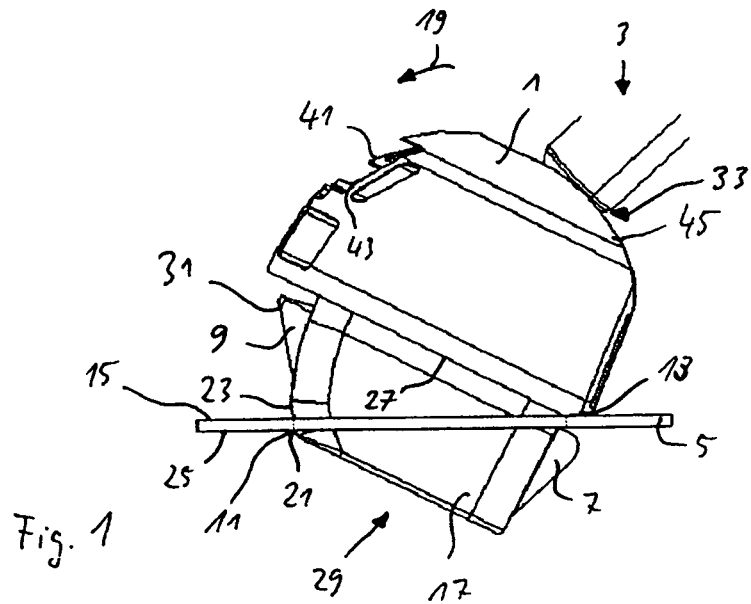
FIGS. 1 to 4 are side views of a joining element with a base in four different phases during the fitting of the joining element to a second, planar component.
Figure 2:
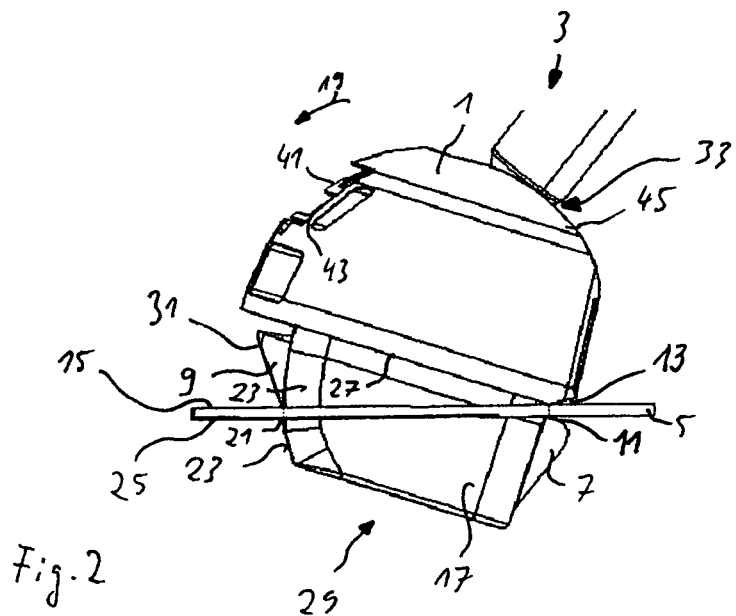

As is apparent in FIG. 1, in order to fit the joining element 1 to the second component 5, the joining element 1 is first of all inserted pivotably into an essentially rectangular aperture 11. For this purpose, the latch 7 is brought into engagement with the aperture 11. A beveled edge 13 of the joining element 1 is also placed onto an upper side 15 of the second component 5. The beveled edge 13 is fitted adjacent to a base 17 which also has the latch 7 and the latching mechanism 9.

For the further fitting of the joining element 1, the latter is pivoted along a pivot axis, as seen in the orientation of FIGS. 1 to 4, to the left, which is indicated by a curved arrow 19. It can be seen that, during the pivoting movement, which is illustrated in FIGS. 1 to 4, a curved sliding surface of the base 17 slides along an edge 21 of the rectangular aperture 11. It can be seen that the latch 7 is interlocked to a lower side 25 of the second component 5 during the entire pivoting movement of the joining element 1, and, consequently, the joining element 1 is fixed in the aperture and guides the pivoting movement.

It can be seen in FIG. 3 that, by means of the pivoting movement, the latching mechanism 9 is pressed in by the edge 21 of the aperture 11. In FIG. 4, the latching mechanism 9 has rebounded again, i.e. is clamped or connected in a form-fitting manner to the lower side 25 of the aperture 11 of the second component 5. It can furthermore be seen that the pivoting movement of the joining element 1 can be continued until a bearing surface 27 of the joining element 1 strikes in a planar manner against the upper side 15 of the second component 5. It can be seen that the bearing surface 27, the latch 7, the latching mechanism 9 and the base 17 realize a connection member 29 for the form-fitting fixing of the joining element 1 to the second component 5. For this purpose, the base 17 can be matched in its shape to the aperture 11, thus resulting in a fixing of the joining element 1 against rotation in the aperture 11.

FIGS. 7 to 10 are views of the joining element 1 shown in FIG. 4, in the fitted state with the second component 5. It can be seen in FIGS. 9 and 10 that the latch 7 of the joining element 1 is of two-part design. In addition, it can be seen in FIGS. 8 and 9 that the latching mechanism 9 is likewise of two-part design with two latching lugs 31. Each of the latching lugs 31 has two webs which can spring into a corresponding aperture of the base 17.

Figure 9:
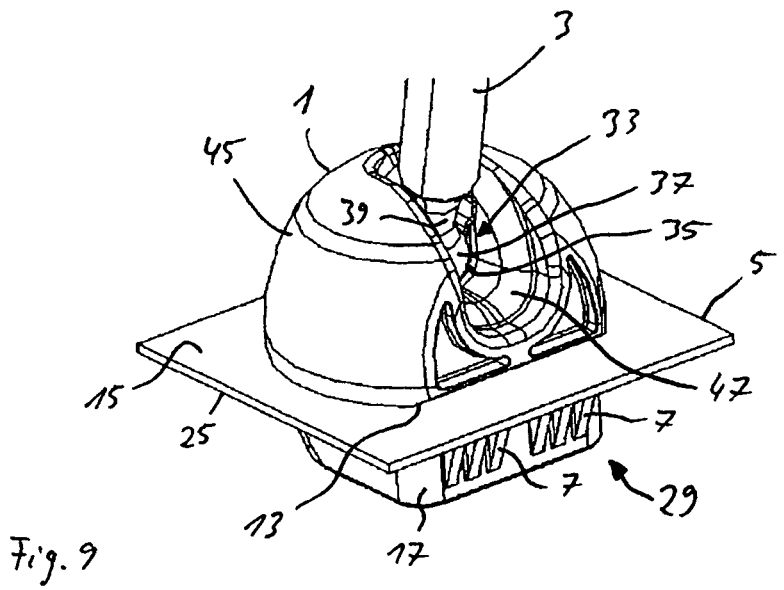
FIG. 9 is a perspective view, from the rear and laterally from above, of the joining element shown in FIGS. 1 to 8.
Figure 10:
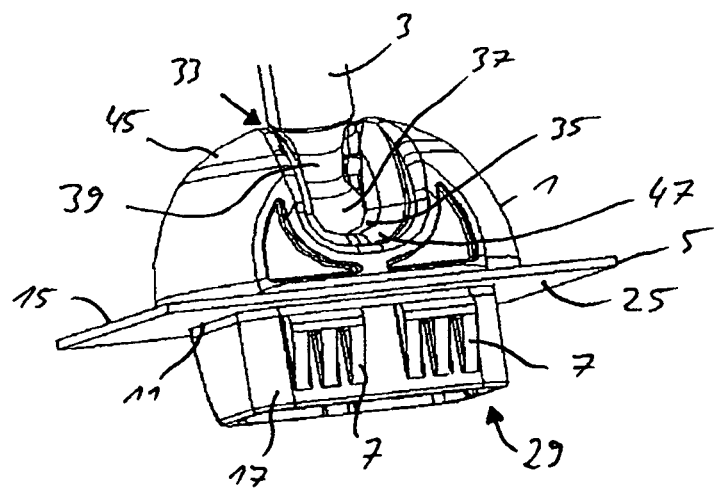
FIG. 10 is a perspective view, from the rear and laterally from below, of the joining element shown in FIGS. 1 to 9.

It can be seen in FIGS. 9 and 10 that the first component 3 is assigned to the joining element 1 by means of a pivot bearing 33. For this purpose, the joining element 1 has a ball socket 35. A ball 37 is inserted into the ball socket 35. The ball 37 is fixedly assigned to the first component 3 via a ball neck 39. In this case, the ball 37 and the ball neck 39 can be integral parts of the first component 3. However, it is also possible, in order to realize the ball 37 and the ball neck 39, to realize a separate component which can be connected to a further component, for example to the first component 3.

Figure 7:
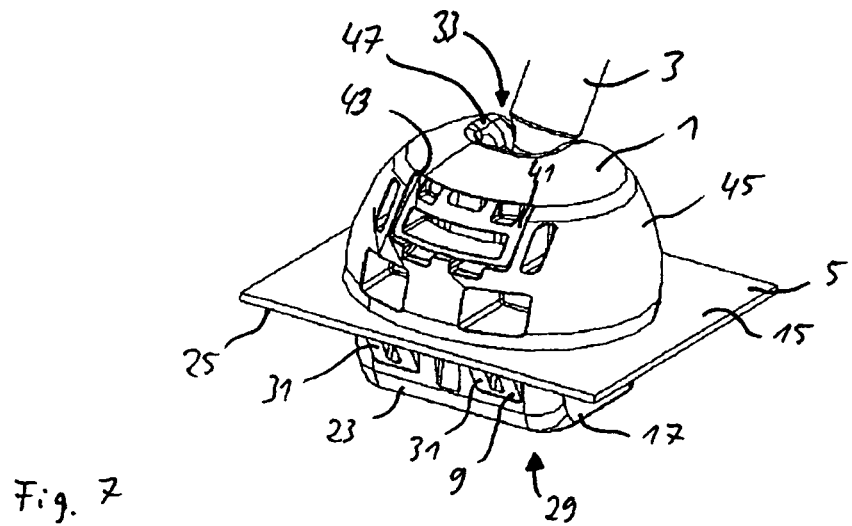
FIG. 7 is a perspective view, from above, of the joining element shown in FIGS. 1 to 6.
Figure 8:
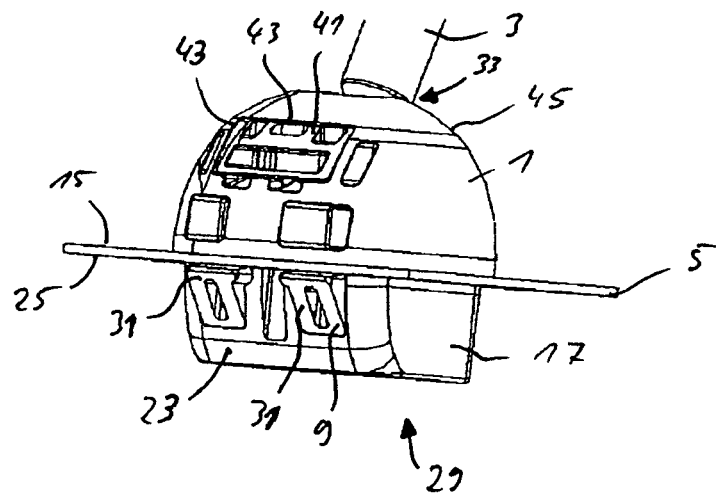
FIG. 8 is a side view, from the front, of the joining element shown in FIGS. 1 to 7.

A clamp 41 which is inserted into a recess 43 of the joining element 1 can be seen in FIGS. 7 and 8. In more precise terms, the joining element 1 has an essentially spherical upper side 45 which has the ball socket 35 and the recess 43 for the clamp 41. The clamp 41 can engage around the ball neck 39 of the ball 37 and can consequently fix the ball 37 in the ball socket 35 of the upper side 45 of the joining element 1.

Figure 11:
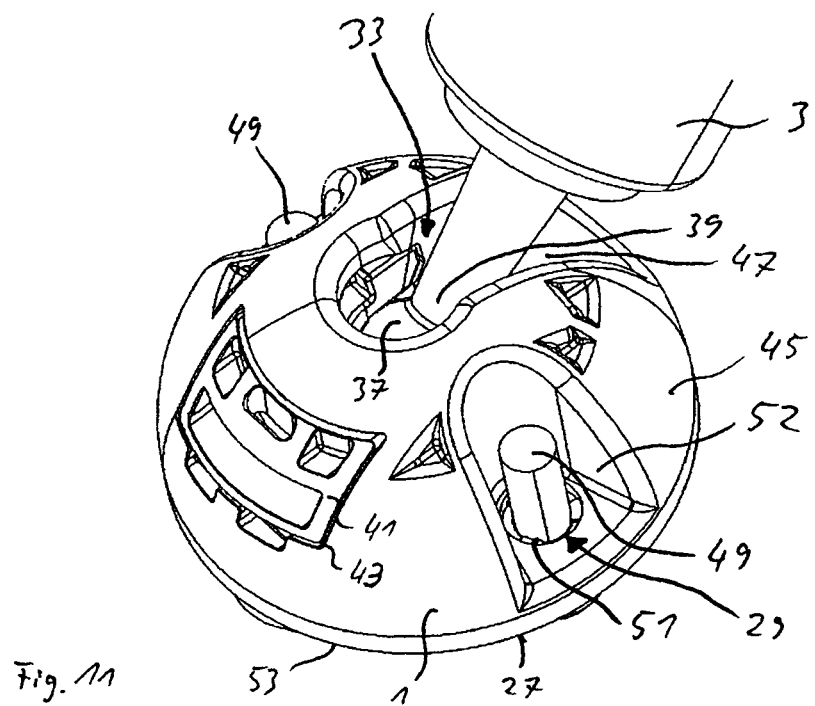
FIG. 11 is a perspective view, from the front and laterally from above, of a further joining element with an expanding stem and a first component connected to the joining element.

FIG. 11 shows a joining element 1 in the fitted state together with a first component 3. The first component 3 is connected to the joining element 1 via the ball 37 and the ball neck 39. To this end, the ball 37 protrudes with the ball neck 39 into a slot-shaped aperture 47 of the upper side 45. The aperture 47 permits a pivoting movement of the second component 5 relative to the joining element 1. Depending on the design of the ball socket 35, it is also possible to permit pivoting movements of the second component 5, which movements are at an angle to the longitudinal extent of the aperture 47. The first component 3 is a bar-shaped component, for example a piston/cylinder unit and/or a gas-filled spring.

Figure 12:
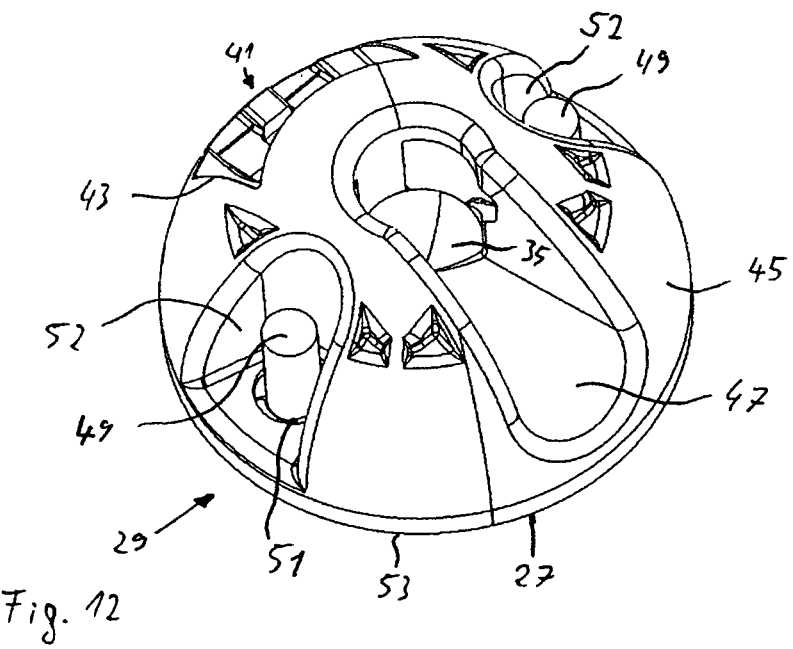
FIG. 12 is a perspective view, from the rear and laterally from above, of the joining element shown in FIG. 11, but without the first component.

The joining element 1 which is shown in FIG. 11 and FIG. 12 without the second component 5 has two fixing stems 49. The fixing stems 49 protrude through two apertures 51 in the region of two recesses 52 on the upper side 45 to a lower side 53 of the joining element 1.

Figure 13:
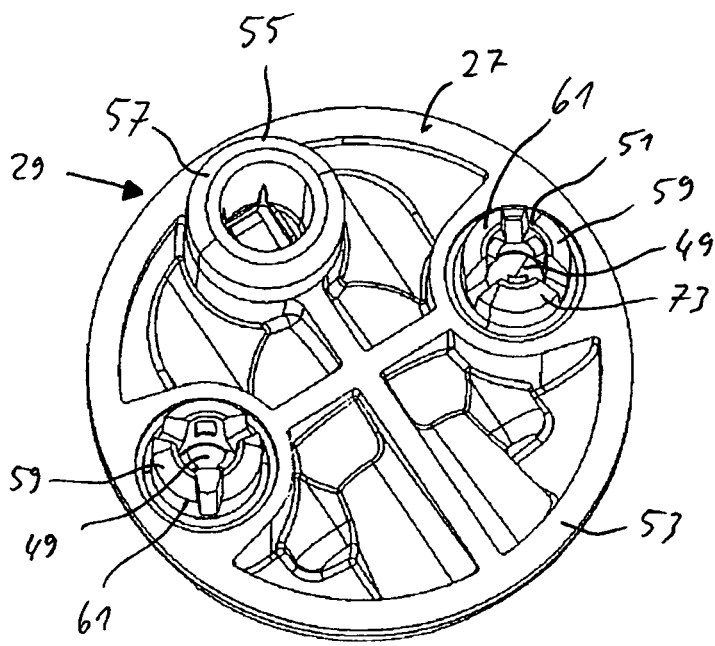
FIG. 13 is a perspective view from below, of the joining element illustrated in FIGS. 11 and 12.

FIG. 13 shows the lower side 53 of the joining element 1. An aligning pin 55 with a chamfer 57 can be seen. In addition, the joining element 1 according to FIG. 13 has two expanding mechanisms 59. The apertures 51 continue through the expanding mechanisms 59, and therefore the fixing stems 49 can be inserted into the expanding mechanisms 59, which leads to a deflection of in each case three expanding elements 61, which are arranged in a circular manner around the apertures 51, of the expanding mechanism 59.

The joining element 1 can be produced, for example, as an injection-molded part.

Figure 14:
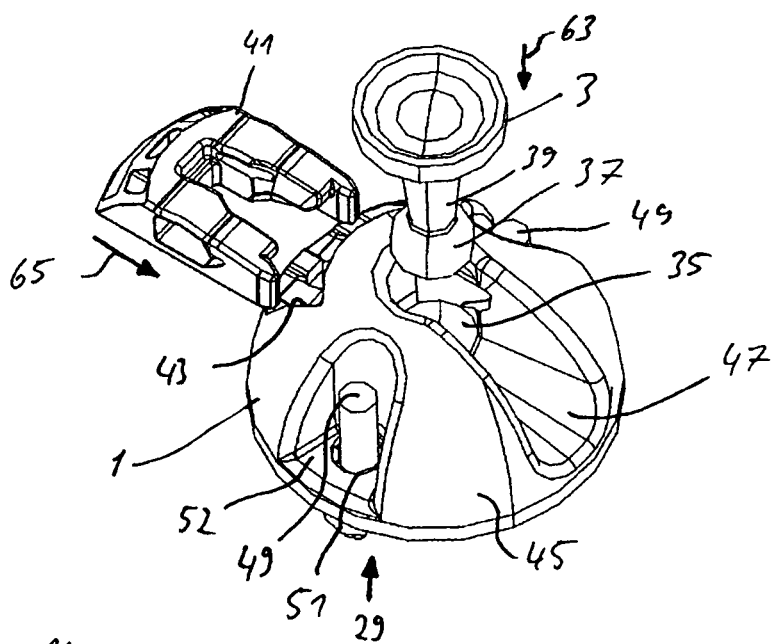
FIGS. 14 to 16 are perspective views of steps for fitting a ball-and-socket joint with a clamp to the joining element.

FIGS. 14 to 18 show various fitting stages for fitting the first component 3 together with the second component 5 with the aid of the joining element 1. In FIG. 14, the ball 37 and the ball neck 39 can be seen outside the ball socket 35. In addition, the clamp 41 is also illustrated outside the shaft 43 of the upper side 45 of the joining element 1. In order to connect the first component 3 to the joining element 1, the ball 37 is first of all to be inserted from above into the ball socket 35, which is indicated by an arrow 63 in FIG. 14. After the ball 37 is inserted into the ball socket 35, the clamp 41 can be pushed into the recess 43, which is indicated by an arrow 65 in FIG. 14.

Figure 15:
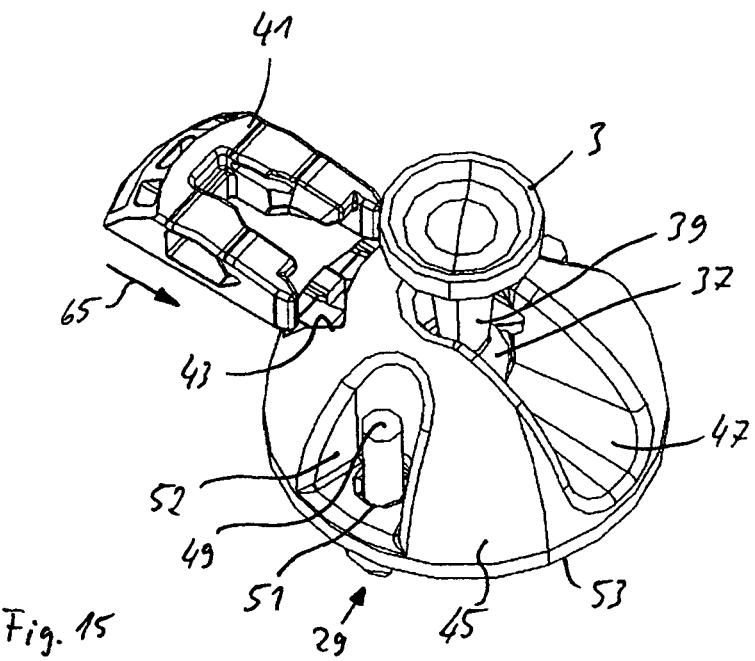

FIG. 15 shows the state after the lowering or insertion of the ball 37 into the ball socket 35.

Figure 16:
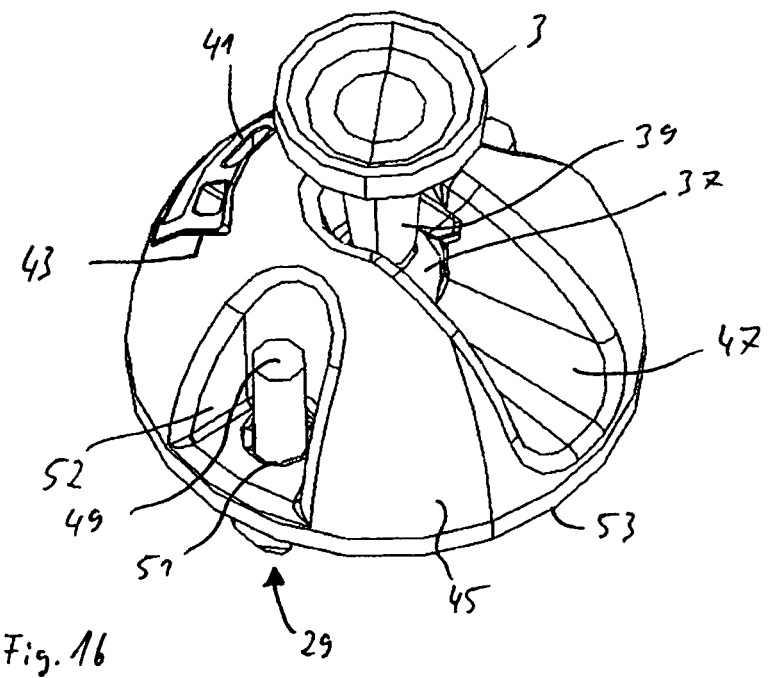
Figure 17:
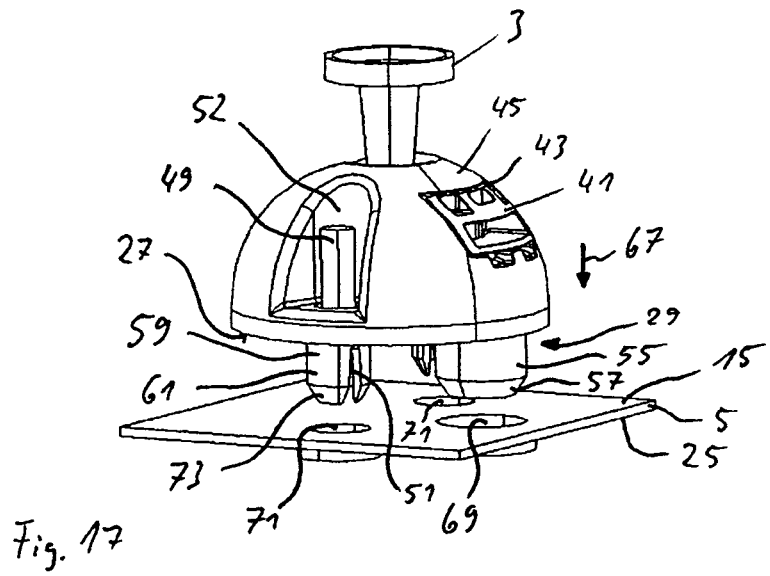
FIGS. 17 to 19 are perspective views which illustrate fitting steps of the joining element shown in FIGS. 11 to 16 to the planar, second component.

FIG. 16 shows the joining element 1 with the first component 3 completely connected. It can be seen that the ball 37 together with the ball neck 39 is located in the aperture 47 of the upper side 45 of the joining element 1. It can also be seen in FIG. 16 that the clamp 41 is entirely pushed into the shaft 43. For the further fitting, i.e. for the fixing of the second component 5 to the joining element 1 or to the first component 3 via the joining element 1, the joining element 1 is lowered onto the second component 5, which is indicated in FIG. 17 by an arrow 67. It can be seen that the second component 5 has an aligning hole 69 for the aligning pin 55 and two fixing holes 71 for the expanding mechanisms 59. During the lowering, as indicated in FIG. 17 by the arrow 67, the aligning pin 55 and the two expanding mechanisms 59 can therefore be inserted into the aligning hole 69 and into the fixing holes 71. It can be seen that the expanding elements 61 of the expanding mechanism 59 each also have a chamfers 73. The chamfer 73 of the expanding elements 61 and the chamfer 57 of the aligning pin 55 can advantageously compensate for a possibly inaccurate positioning relative to the second component 5 during the fitting of the joining element 1, thus resulting overall in easier fitting.

Figure 18:
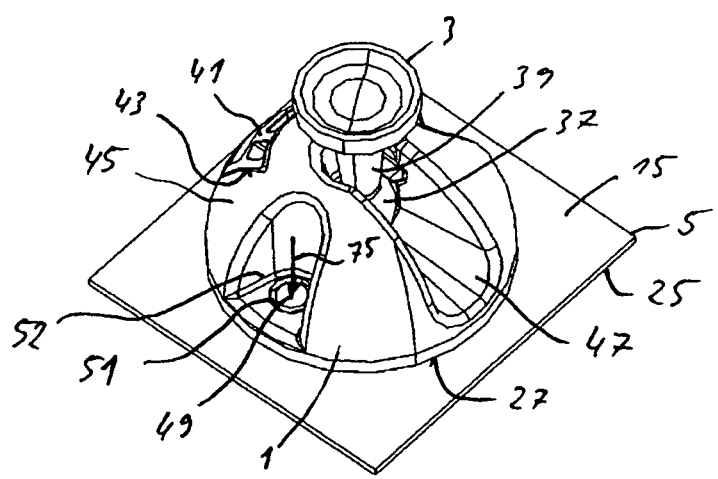

FIG. 18 shows the joining element 1 in a completely connected state with the second component 5. It can be seen that the bearing surface 27 of the lower side 53 of the joining element 1 bears in a planar manner against the upper side 45 of the second component 5. In addition, according to the illustration in FIG. 18, the fixing stems 49 are knocked in—starting from a position partially in the recesses 52 of the upper side 45—i.e. are inserted into the apertures 51 of the joining element 1, which is indicated by an arrow 75. As a result, the expanding elements 61 of the expanding mechanisms 59 are placed against the insides of the fixing holes 71 in a form-fitting and/or frictional manner, thus effectively preventing the joining element 1 from being removed from the second component 5 counter to the fitting direction, as indicated by arrow 67.

Figure 19:
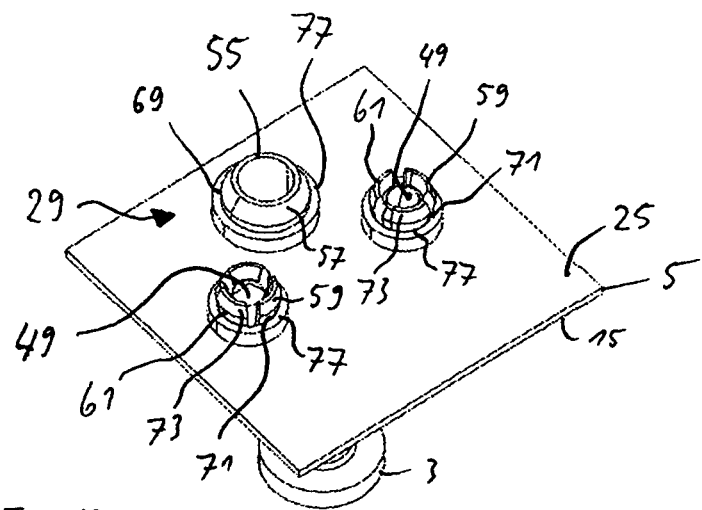

FIG. 19 likewise shows the joining element 1 in the completely fitted state, as illustrated in FIG. 18, but obliquely from below. It can be seen that the aligning hole 69 and the fixing holes 71 have edges 77, for example in order to improve the bearing contact and the fixing of the joining element 1 on the second component 5. The expanding mechanism 59 and the aligning pin 55 protrude slightly beyond the edges 77 of the holes 69 and 71, thus resulting in a good form-fitting and/or frictional bearing contact.

Figure 20:
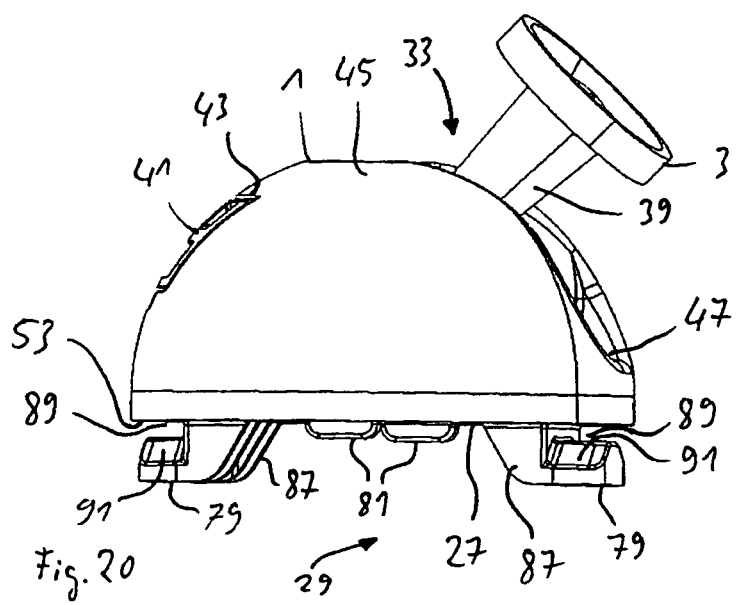
FIG. 20 is a side view of a joining element with two sliding shoes and two latching pegs.
Figure 21:
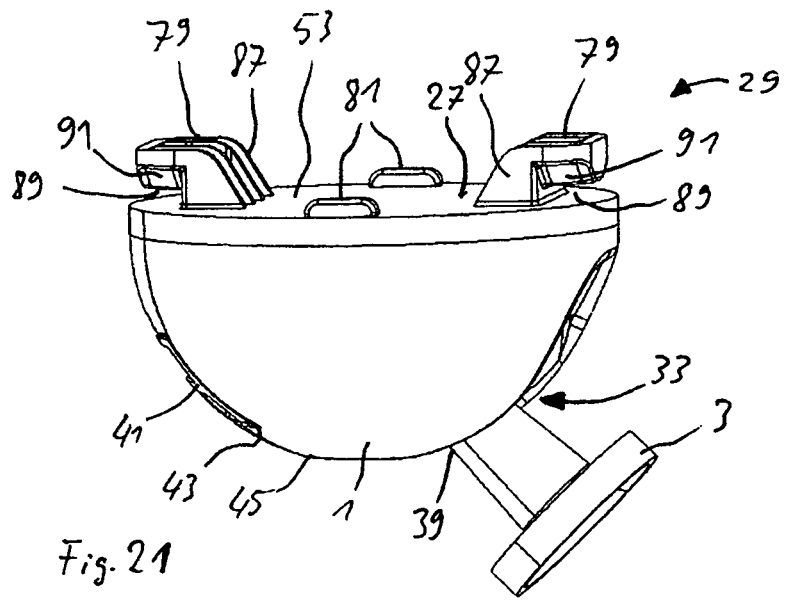
FIG. 21 is a perspective view, from below laterally, of the joining element shown in FIG. 20.

FIG. 20 shows a further joining element 1 with two sliding shoes 79 and two latching pegs 81. FIG. 21 shows the joining element 1 illustrated in FIG. 20, in a three-dimensional illustration, obliquely from below laterally.

Figure 22:
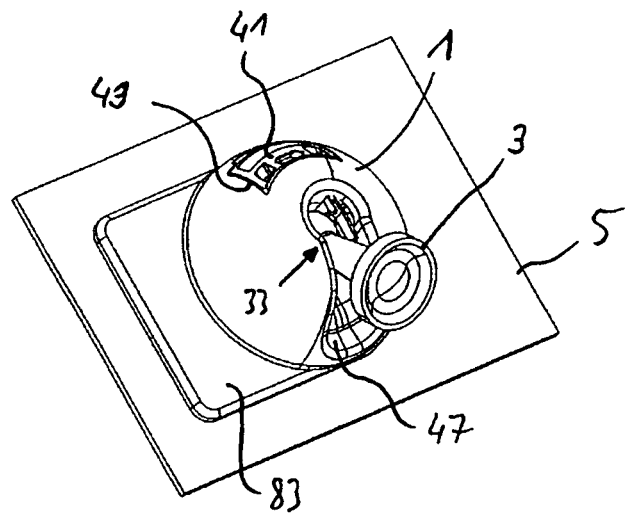
FIG. 22 is a perspective of the joining element shown in FIGS. 20 to 21, from above at the rear, together with a half covering and the second component.
Figure 23:
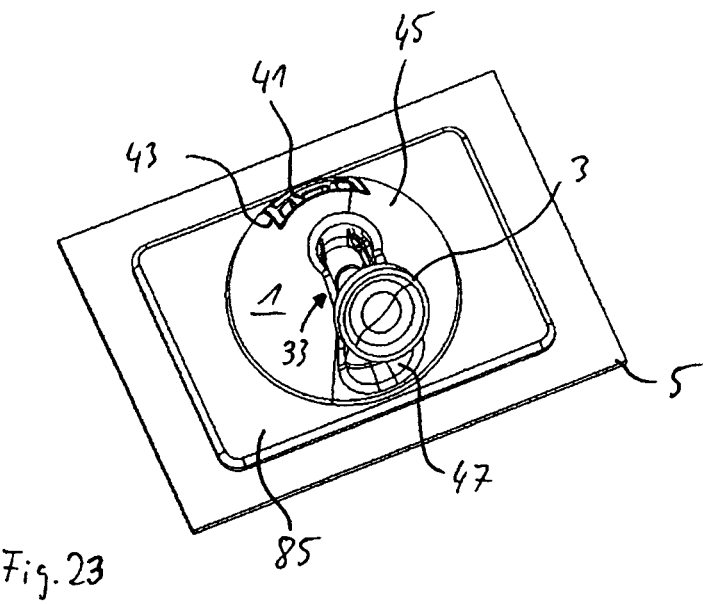
FIG. 23 shows the joining element illustrated in FIG. 22, but with a covering completely surrounding the joining element.

FIGS. 22 and 23 each show the joining element illustrated in FIGS. 20 and 21, in the fitted state together with the second component 5, in FIG. 22 together with a covering 83 partially it in a semicircular manner, and, in FIG. 23, with a covering 85 completely surrounding the joining element 1 in a circular manner.

FIGS. 24 to 27 show the joining element 1 together with the second component 5 in various fitting stages.

As can be seen in FIGS. 20 and 21, the sliding shoes 79 are arranged in a manner lying opposite each other on the lower side 53 of the joining element 1. For this purpose, the lower side 53 of the joining element 1 has two ribbed supports 87 which continue in the sliding shoes 79, with the sliding shoes being arranged diametrically opposite each other and pointing away from each other. Between the lower side 53 of the joining element 1 and the sliding shoes 79 there is a respective sliding recess 89 between which the second component 5 can be clamped. In addition, the sliding shoes 79 each have bevelled edges 91 on both sides, which permit better threading of the sliding shoes 79 into the second component 5. This threading-in operation is explained in more detail below with reference to FIGS. 24 to 27.

Figure 24:
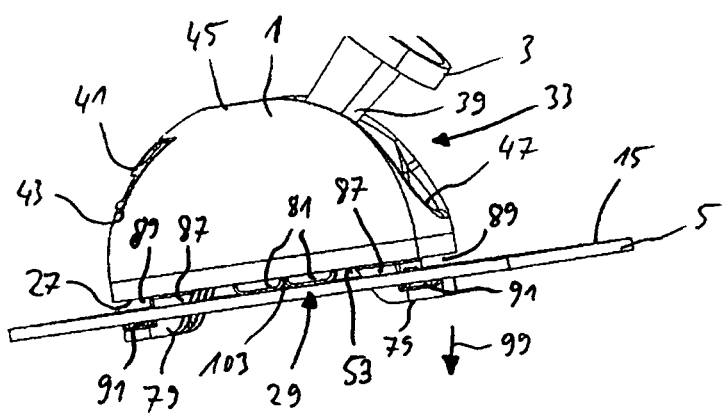
FIG. 24 is a side view of the joining element illustrated in FIGS. 20 to 23, in a partially fitted state together with the second component.
Figure 25:
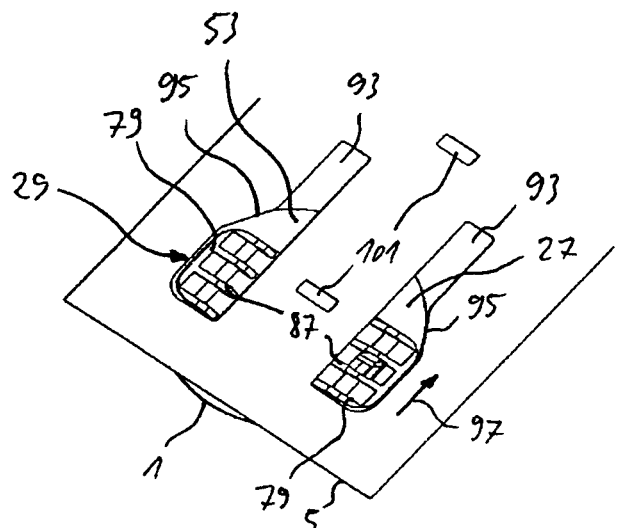
FIG. 25 is a perspective view, from below, of the joining element illustrated in FIG. 24, in the partially fitted state.

It can be seen in FIG. 25 that the second component 5 has two slots 93 arranged in parallel. Each of the slots 93 has a tapered portion 95 approximately in the center. The slots 93 therefore each have a region of greater width and a region of smaller width following the tapered portion 95. The slots 93 are arranged in a mirror-symmetrical manner with respect to each other. It can be seen in FIG. 25 that the sliding shoes 79 and parts of the supports 87 of the joining element 1 can be inserted into the regions of greater width of the slots 93. This state can also be seen in FIG. 24. In this partially fitted state, the latching pegs 81 sit on the upper side 15 of the second component 5. In addition, it can be seen in FIG. 24 that the sliding shoes 79 at least partially protrude into the slots 93, i.e. their bevelled edges 91 also at least partially protrude therein. In order to fit the joining element 1 to the second component 5, the joining element 1 can now be moved linearly along the slots 93, which is indicated by an arrow 97 in FIG. 25. In order to compensate for the distance arising because of the latching pegs 81 sitting on them, the sliding shoes 79 can spring out from the lower side 25 of the second component 5, which is illustrated in FIG. 24 by an arrow 99.

Figure 26:
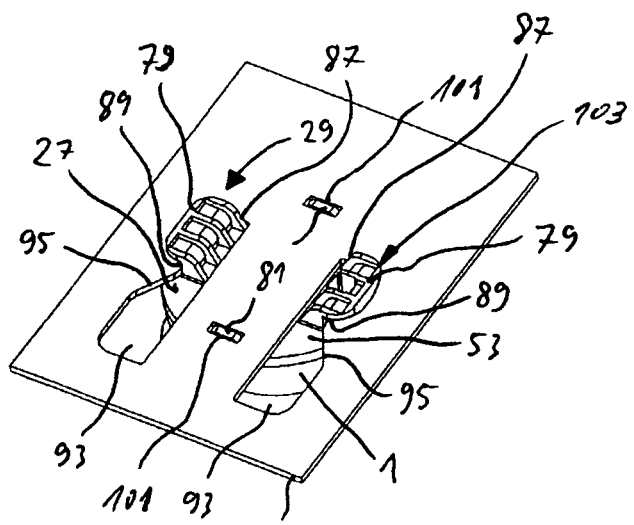
FIG. 26 is a perspective view, from below, of the joining element illustrated in FIGS. 20 to 25, in the fitted state together with the second component.
Figure 27:
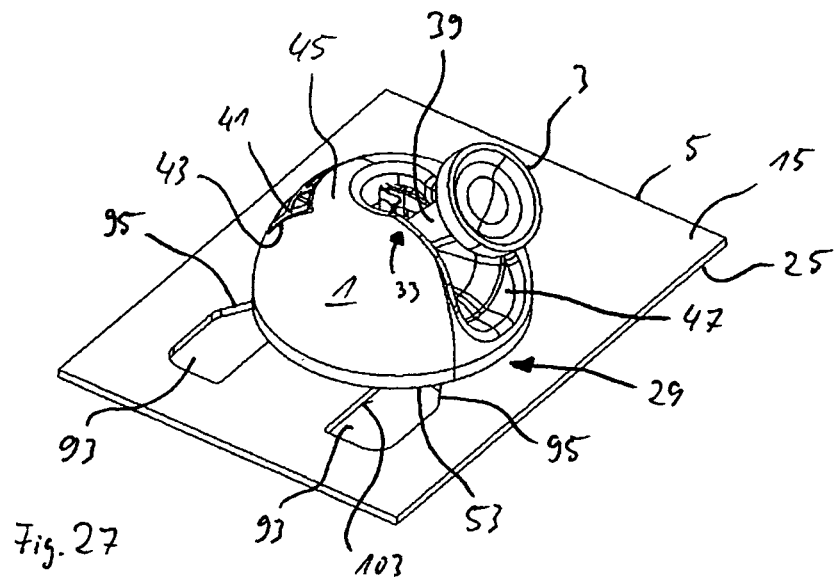
FIG. 27 is a perspective view, from above at the rear, of the joining element illustrated in FIG. 26, in the fitted state together with the second component.

FIGS. 26 and 27 show the joining element 1 in a completely fitted state together with the second component 5. For this purpose, the first joining element 1 is moved in the direction of the arrow 97 until the latching pegs 81 latch into corresponding latching apertures 101 of the second component 5.

As a result, the sliding shoes 79 can spring back again, thus reducing the distance of the lower side 53 of the joining element 1 to the second component to 0, i.e. the bearing surface 27 bears against the second component 5 in a planar manner. It can be seen that the sliding shoes 79 engage around the lower side 25 of the second component 5, i.e. prevent the joining element 1 from being raised. If appropriate, the sliding shoes 79 may additionally be placed under a prestress for this. To this end, the clear width of the sliding recesses 89 can be dimensioned to be slightly smaller than the thickness of the second component 5. A linear movement away of the second component 5 is prevented by the latching pegs 81 which are latched in the latching apertures 101.

The sliding shoes 79 and the slots 93 and the latching pegs 81 sitting on them overall form a sliding bearing 103 for the first joining element 1 relative to the second component 5. The sliding bearing 103 can be blocked in an end position by means of the latching pegs 81 and the latching apertures 101. Consequently, the sliding bearing 103 serves to more easily fit the joining element 1 to the second component 5 and at the same time serves as a connection 29 for fixing purposes.

It is apparent in FIG. 27 that, in the fitted state of the joining element 1, the wider sections of the two slots 93 remain visible. Consequently, a view of components situated behind it and/or possibly of leakages would ensue. In this connection, as illustrated in FIG. 22, a covering 83 which partially surrounds the joining region between the first joining element 1 and the second component 5 in a semicircular manner can be used. However, in order to obtain a symmetrical optical effect, it is also possible to provide a covering 85 which completely surrounds the joining region. For this purpose, the coverings 83 or 85 can be of planar design and can be connected to the second component 5 and/or to the first joining element 1 in any desired manner. It is possible, for example, to fix the coverings 83 or 85 on the second component 5, in particular at the slots 93 and/or on the upper side 45 of the first joining element 1, for example to fix them in a form-fitting manner, in particular to latch them in place, or to provide them as an integral part of the joining element 1.

Figure 28:
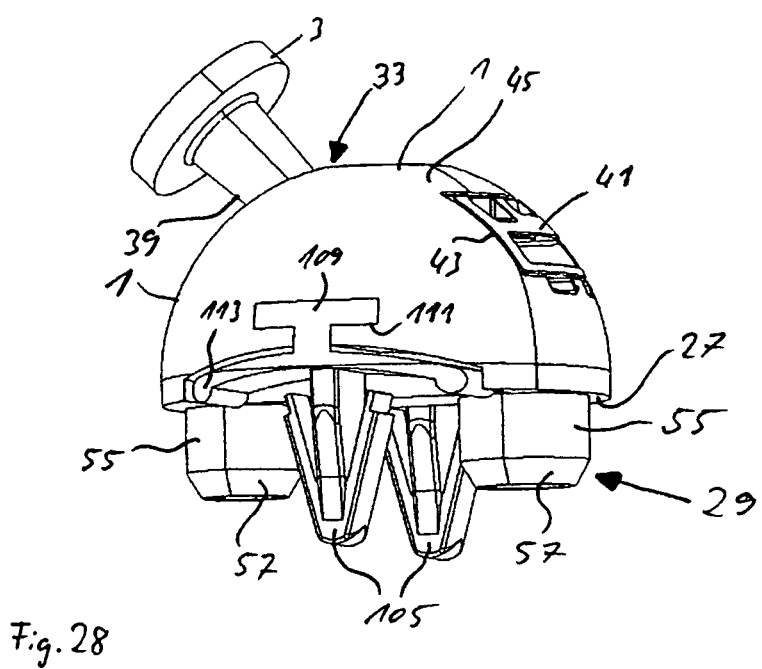
FIG. 28 is a perspective view, from the front laterally, of a joining element with two centering pins and two clips.

FIG. 28 shows a further joining element 1 with two removable clips 105 and two aligning pins 55.

Figure 29:
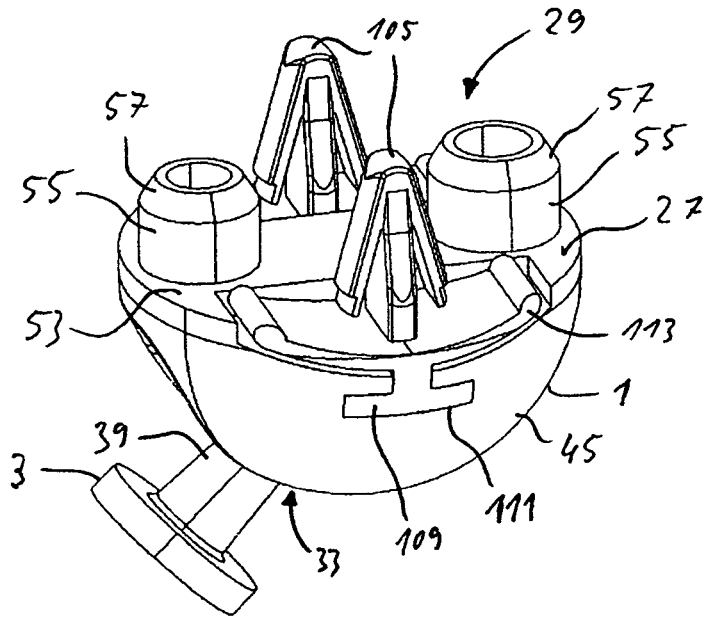
FIG. 29 is a perspective view, laterally and from below at the rear, of the joining element illustrated in FIG. 28.

FIG. 29 shows the joining element 1 shown in FIG. 28, obliquely from below.

Figure 30:
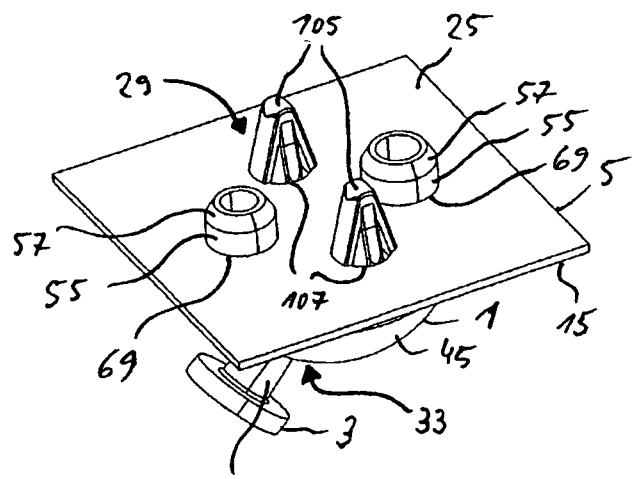
FIG. 30 is a perspective view, laterally and from below at the rear, of the joining element shown in FIGS. 28 and 29, in the fitted state with the second component.
Figure 31:
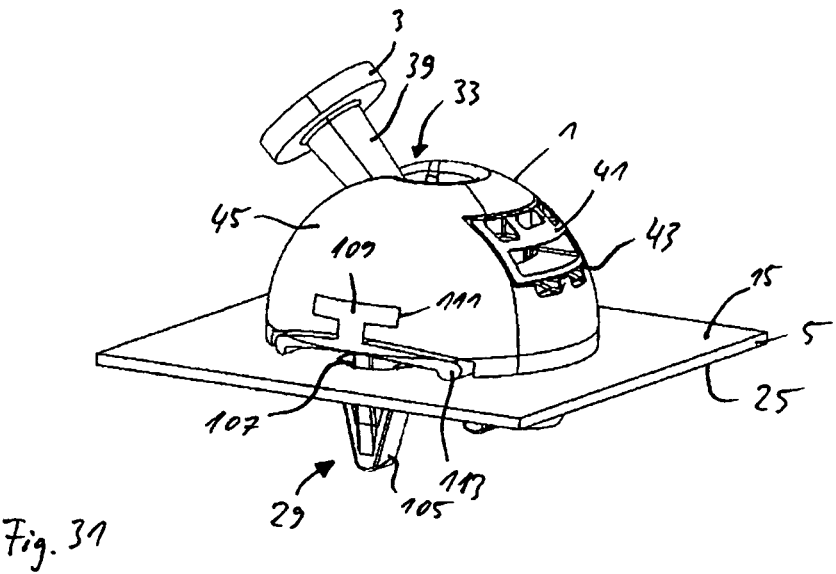
FIG. 31 is a perspective view, from the front and laterally from above, of the joining element illustrated in FIG. 30, in a fitted state with the second component.

FIGS. 30 and 31 show the joining element 1 illustrated in FIGS. 28 and 29, together in the fitted state with the second component 5.

In this connection, the aligning pins 55 are inserted into corresponding aligning holes 69. The clips 105 are latched into clip holes 107.

It can be seen in FIGS. 28 and 31 that the clips 105 have a T-shaped rib 109 which can be pushed into a corresponding T-shaped recess 111 of the joining element 1. The clips 105 can advantageously be standard parts which can be pushed on both sides into the corresponding recesses 111 before the joining element 1 is fitted. In addition, it can be seen that the clips 105 have a spring element 113 with two spring arms, the spring arms being supported in the fitted state, as shown in FIG. 31, on the upper side 15 of the second component 5. Consequently, a certain compensation for tolerances can take place by means of the spring elements 113. It is therefore possible to design the tolerance between the bearing surface 27 and the upper side 15 of the second component 5 to be somewhat greater, with it being possible for the tolerance which occurs to be compensated for by the spring elements 113 of the clips 105, for example in order to reduce a rattling tendency which is possibly present.

Figure 32:
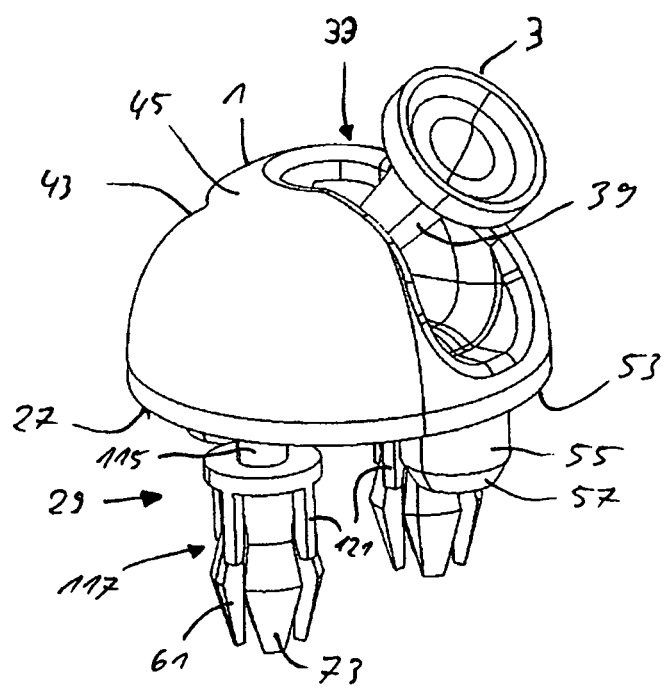
FIG. 32 is a perspective view, from the rear and laterally from above, of a joining element with two centering pins and two fixed centering stems surrounded by two expanding mechanisms.

FIG. 32 shows a further exemplary embodiment of a joining element 1 with two fixed expanding stems 115 and two separate expanding mechanisms 117 surrounding the expanding stems.

FIGS. 33 to 36 show various stages of the fitting of the joining element 1 to the second component 5.

Figure 33:
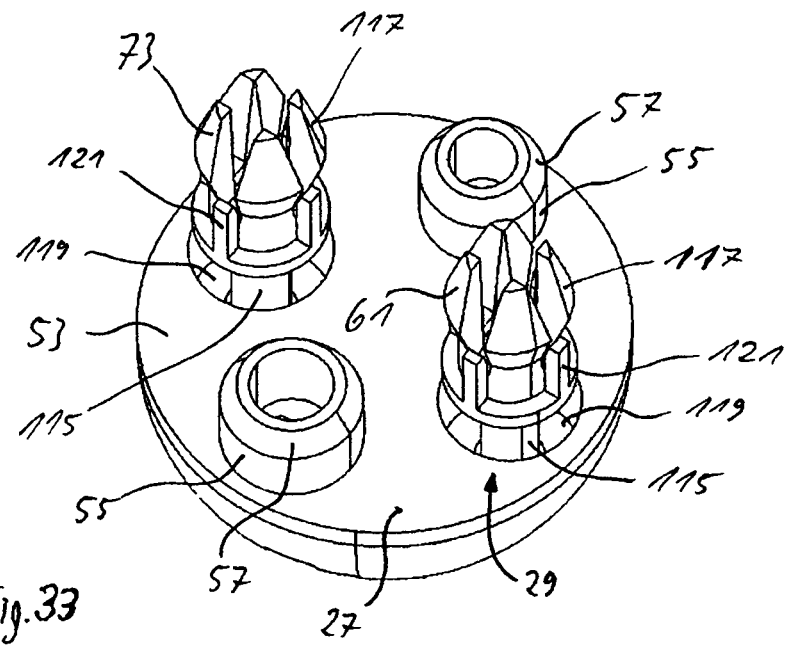
FIG. 33 is a perspective view, from below, of the joining element shown in FIG. 32.
Figure 34:
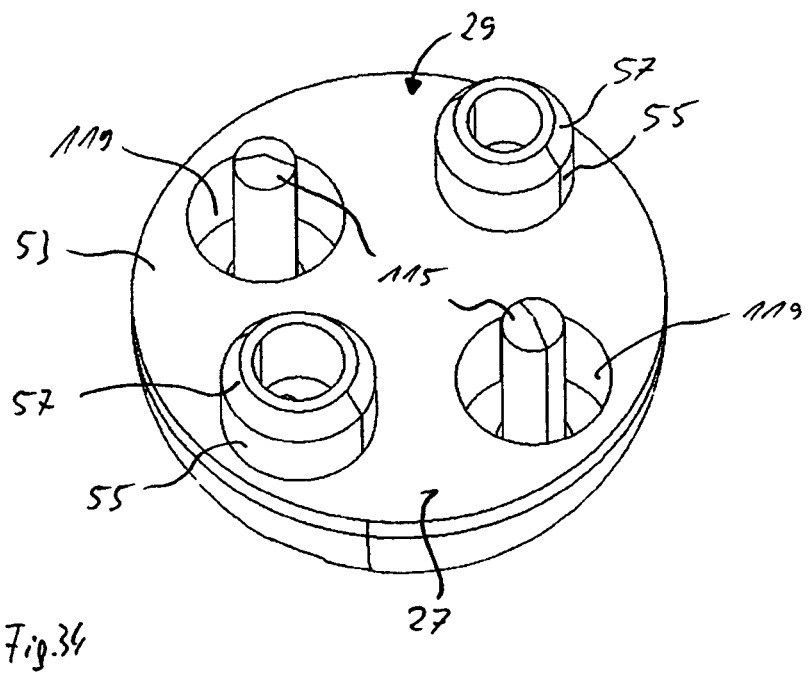
FIG. 34 shows the joining element illustrated in FIG. 33, but without the separate expanding mechanisms.

As is apparent in FIG. 34, the expanding stems 115 are accommodated centrally in blind holes 119 in the lower side 53 of the joining element 1. In addition, the joining element 1 has two aligning pins 55. As can be seen in FIG. 33, the separate expanding mechanisms 117 can be pulled over the expanding stems 115.

Figure 35:
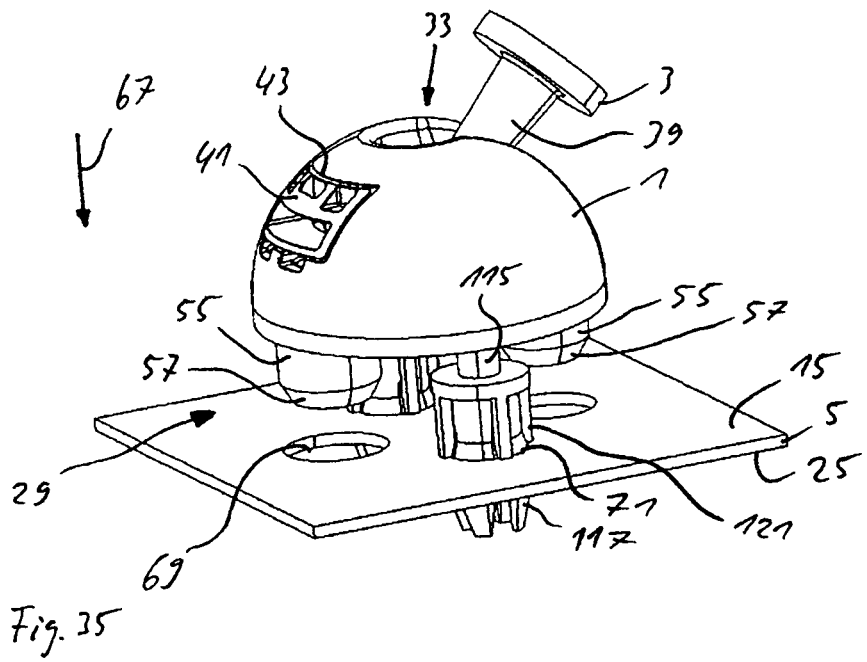
FIG. 35 is a perspective view, from above and laterally from the front, of the joining element shown in FIGS. 32 to 34, in a partially fitted state with the second component.
Figure 36:
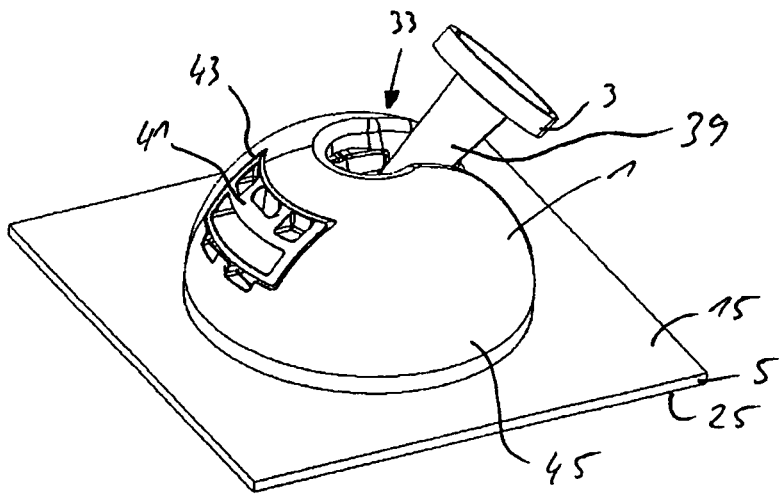
FIG. 36 is a perspective view of the joining element illustrated in FIG. 35, in the fitted state with the second component.
Figure 37:
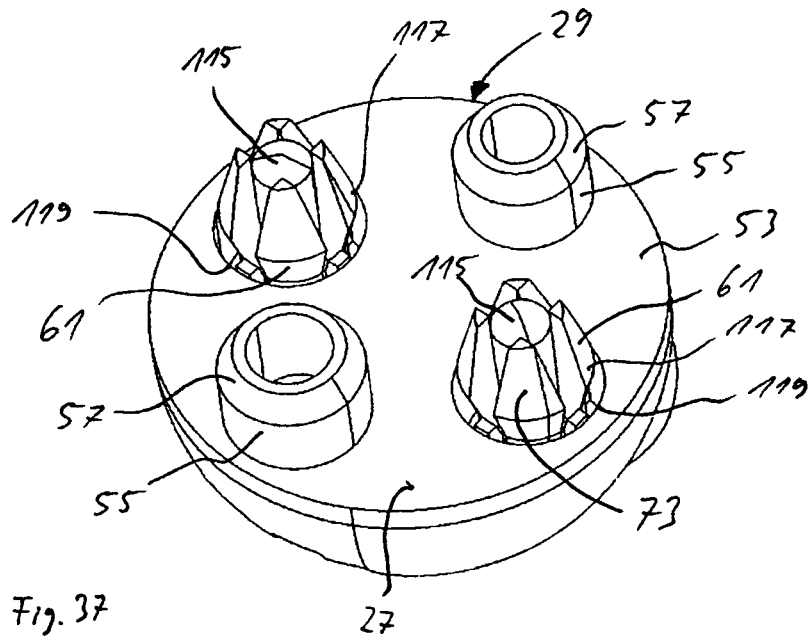
FIG. 37 is a perspective view of the joining element illustrated in FIG. 33, from below, with expanding devices pushed onto the expanding stems.

FIG. 35 shows the joining element 1 in a partially fitted state together with the second component 5. The expanding mechanisms 117 each have four webs 121 which are supported during the fitting, as shown in FIG. 35, on the upper side 15 of the second component 5. In the fitted state, the webs 121 come to lie entirely within the blind holes 119. In this case, the expanding stems 115, as apparent in FIG. 37, are entirely within the expanding mechanisms 117. As a result, four expanding elements 61 of the separate expanding mechanisms 117 are deflected radially outwards such that they connect to corresponding fixing holes 71 of the second component 5 in a form-fitting and/or frictional manner.

Figure 38:
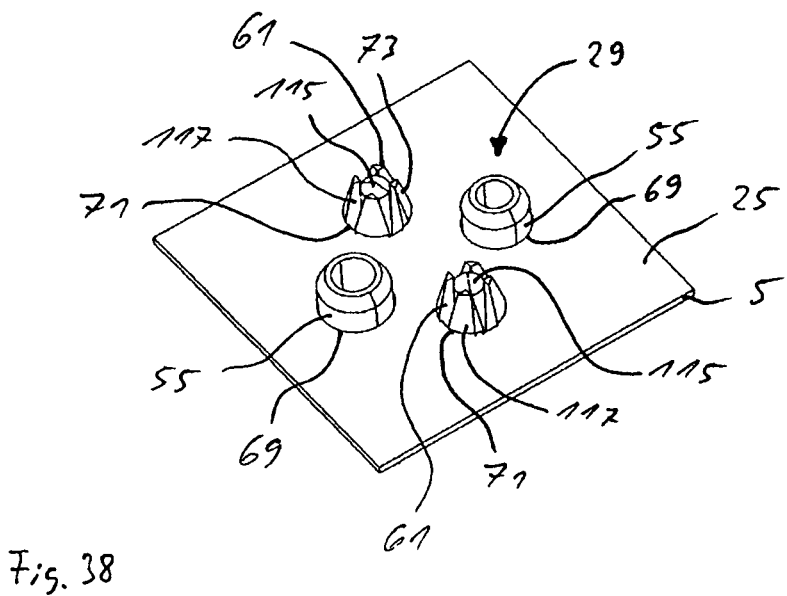
FIG. 38 is a perspective view of the joining element illustrated in FIG. 37, in the fitted state with the second component.

As illustrated in FIG. 38, there is therefore the quadruple fixing of the joining element 1 to the second component 5, namely via the two aligning pins 55 in the associated aligning holes 69 of the first joining element 1 and by means of the two separate expanding mechanisms 117 which are expanded by means of the expanding stems 115 and are located in corresponding fixing holes 71. The expanding stems 115, the expanding mechanisms 117 with the expanding elements 61 and the bearing surface 27 of the lower side 53 of the joining element 1 form a connection 29 for fixing the joining element 1 in the holes 69 and 71 of the second component 5.

Figure 39:
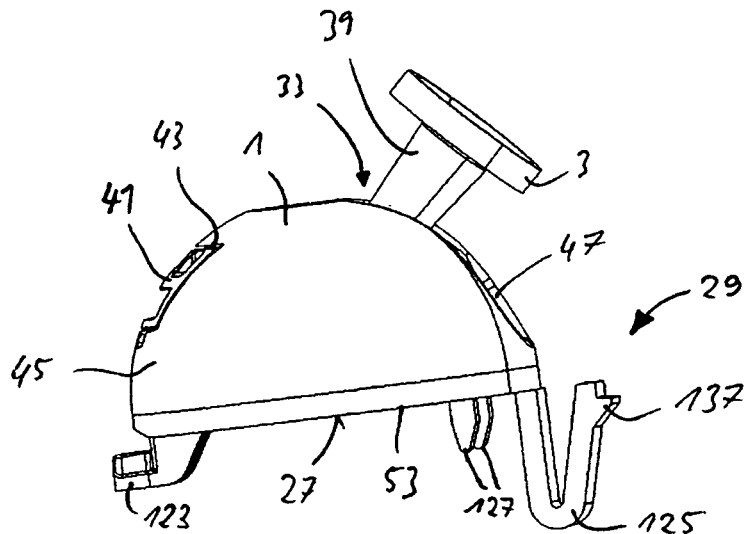
FIG. 39 is a side view of a joining element, laterally from the rear, with a gripping shoe, two aligning pegs and a clip.

FIG. 39 shows a side view of a joining element 1 with a gripping shoe 123, a clip 125 arranged lying opposite the gripping shoe 123 and two aligning pegs 127 arranged between the gripping shoe 123 and the clip 125 on the lower side 53 of the joining element 1.

Figure 40:
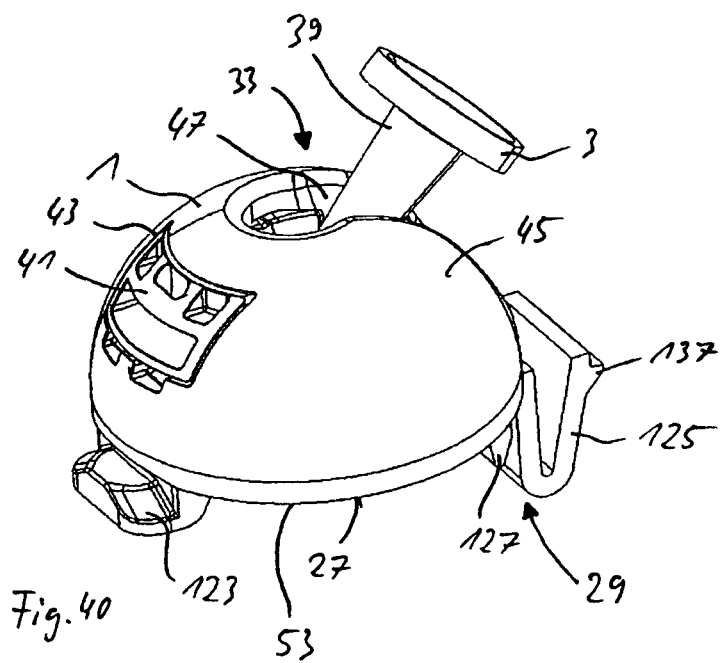
FIG. 40 is a perspective view of the joining element illustrated in FIG. 39, from the front and laterally from above.
Figure 44:
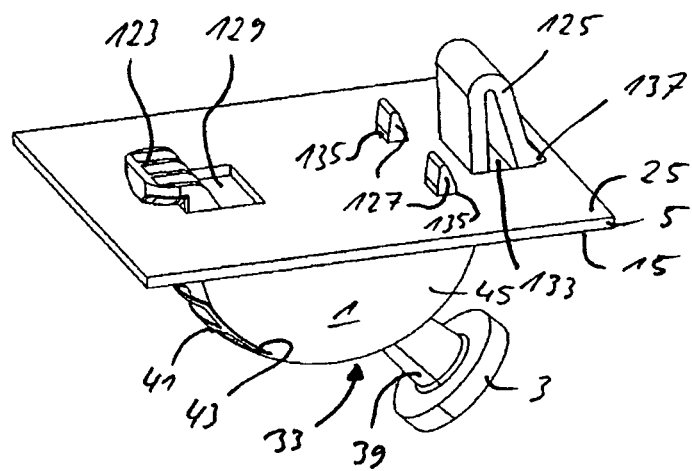
FIG. 44 is a perspective view of the joining element illustrated in FIGS. 41 to 43, from the front and below, together with the second component in the fitted state.

FIG. 40 is a perspective view of the joining element 1 illustrated in FIG. 39. FIGS. 41 to 44 illustrate various fitting stages of the joining element 1 shown in FIGS. 39 and 40 to the second component 5. FIG. 44 shows the completely fitted state of the joining element 1 to the second component 5.

Figure 41:
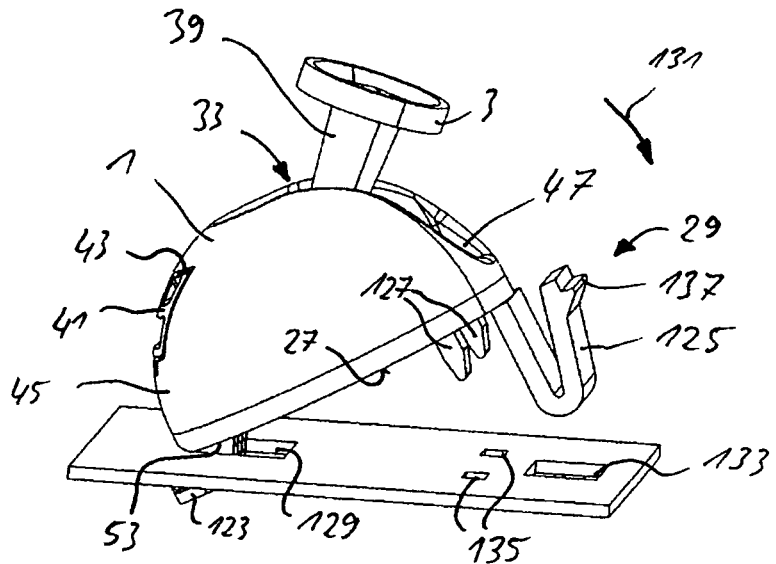
FIGS. 41 to 43 show the joining element illustrated in FIGS. 39 and 40, together with the second component in various fitting stages.

As is apparent in FIG. 41, in order to fit the joining element 1 to the second component 5, the gripping shoe 123 first of all engages in a corresponding gripping aperture 129 of the joining element 1. In this case, the lower side 53 of the joining element 1 is arranged at an angle to the upper side 15 of the second component 5. For the further fitting, the joining element 1 can be pivoted about a pivot axis close to the gripping shoe 123 and the associated gripping aperture 129 in such a manner that the lower side 53 of the joining element 1 is lowered in the direction of the upper side 15 of the second component 5, which is indicated by an arrow 131 in FIGS. 41 and 42.

Figure 42:
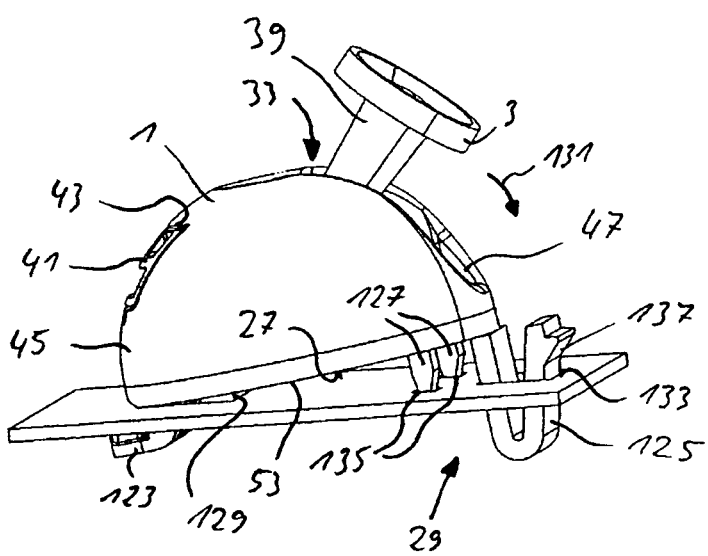
Figure 43:
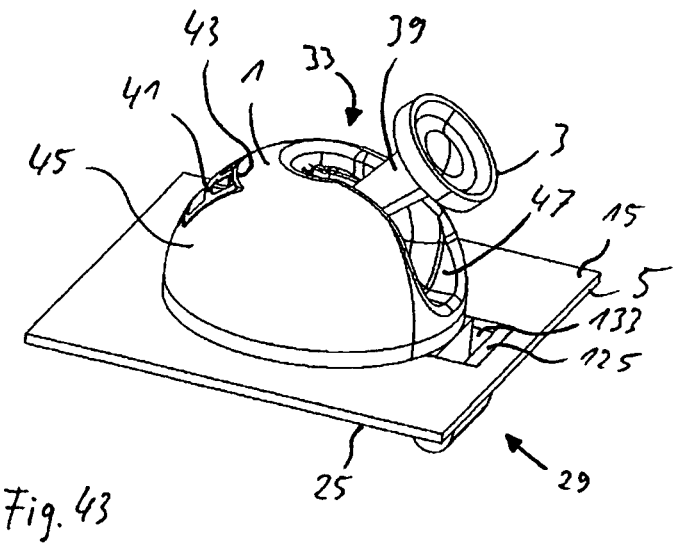

In FIG. 42, the pivoting movement is advanced to such an extent that the clip 125 already partially engages in a corresponding clip aperture 133. In addition, the aligning pegs 127 likewise already partially engage in two corresponding aligning apertures 135.

As can be seen in FIG. 44, in the completely fitted state of the joining element 1 to the second component 5, a latching lug 137 is in engagement with the lower side 25 of the second component 5 such that a pivoting back counter to the direction of the arrow 131 is not possible. It can be seen that the bearing surface 27 of the joining element 1, the gripping shoe 123, the clip 125 and the aligning pegs 127 realize a connection 29 for the form-fitting and/or frictional fixing of the joining element 1 on the second component 5.

Figure 45:
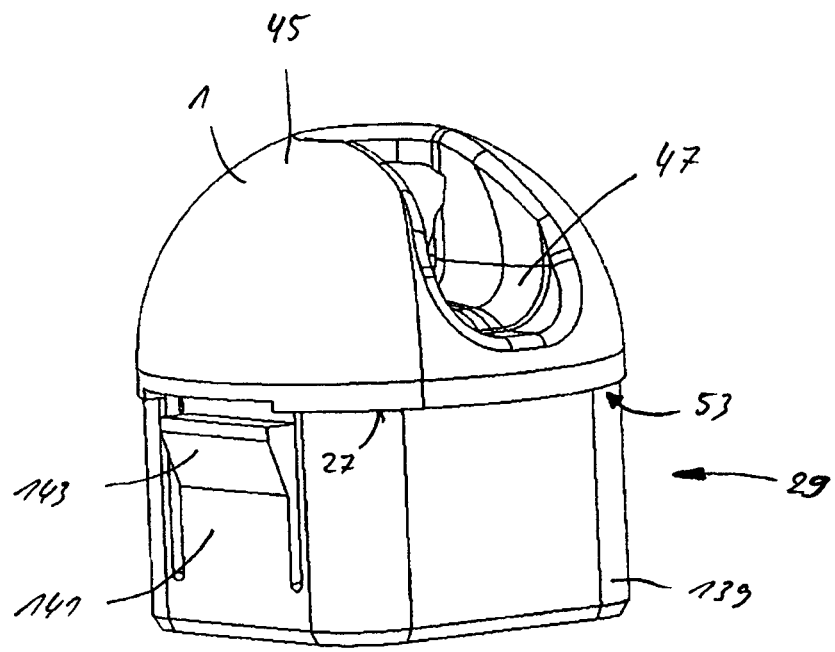
FIG. 45 is a perspective view, from the rear and from above, of a joining element with a dome with two latching tongues.
Figure 46:
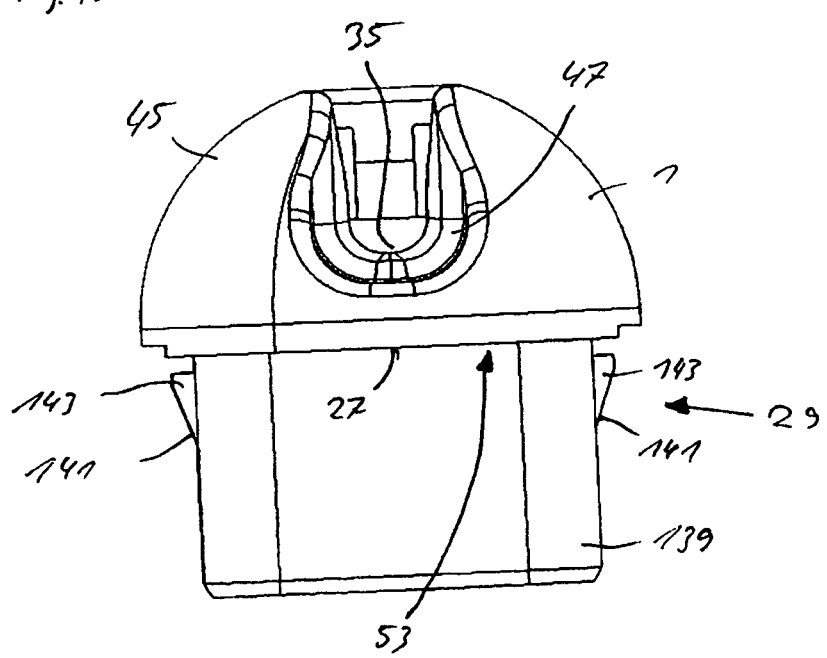
FIG. 46 is a side view from the rear of the joining element illustrated in FIG. 45.

FIG. 45 shows a further joining element 1 with a connection 29 which has a base 139. The base 139 is of essentially cuboidal configuration with rounded corners. FIG. 46 is a rear view of the joining element 1.

Figure 47:
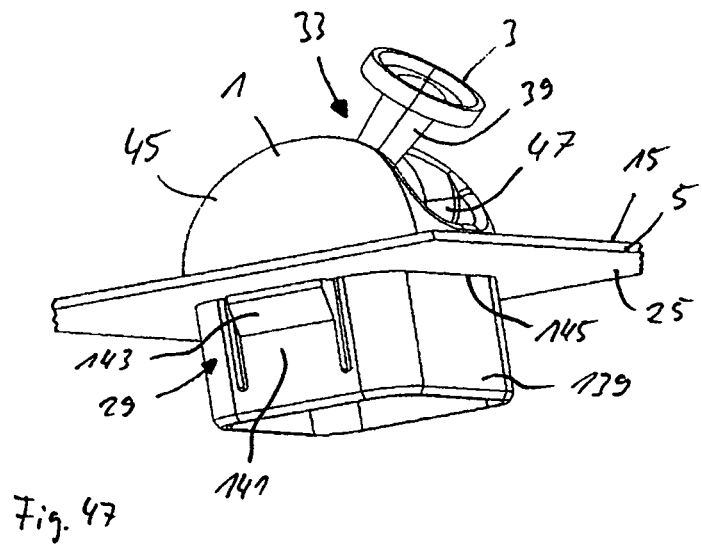
FIG. 47 is a perspective view, from the rear and laterally from below, of the joining element illustrated in FIGS. 45 to 46, in the fitted state with the second component.
Figure 48:
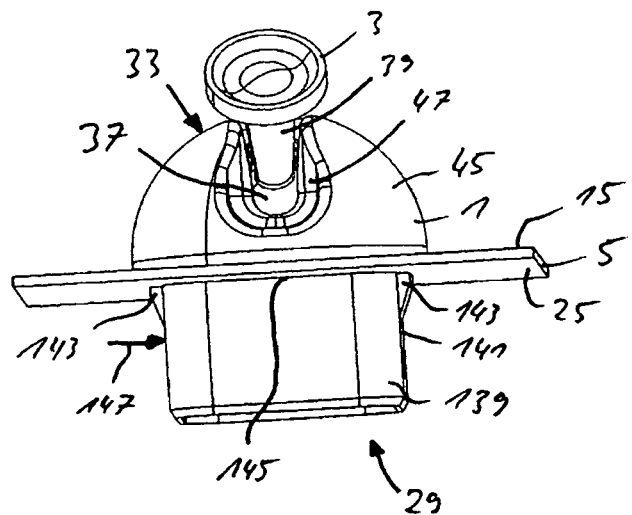
FIG. 48 is a perspective view of the joining element illustrated in FIG. 47, from the rear and below, in the fitted state with the second component.
Figure 49:
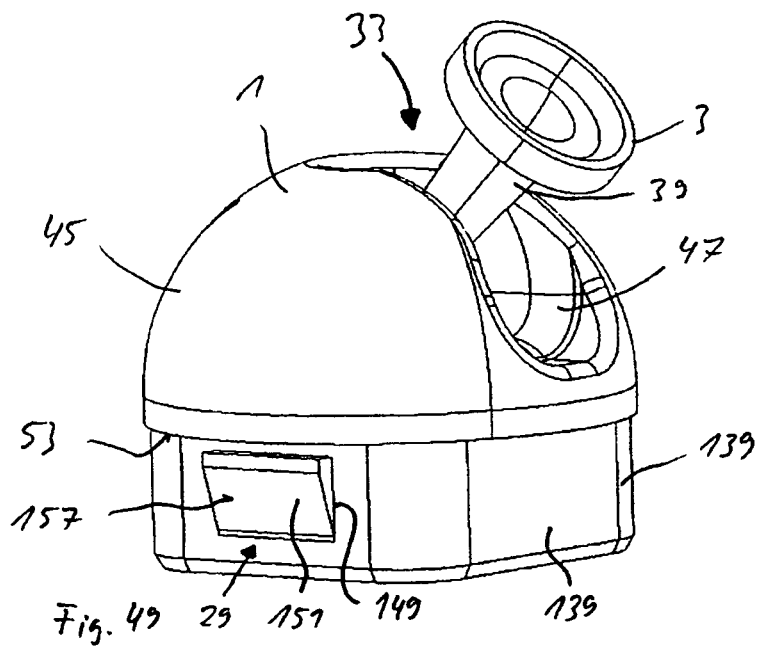
FIG. 49 is a perspective view, from the rear and laterally from above, of a further joining element with a dome and with a spring ring with two latches.
Figure 50:
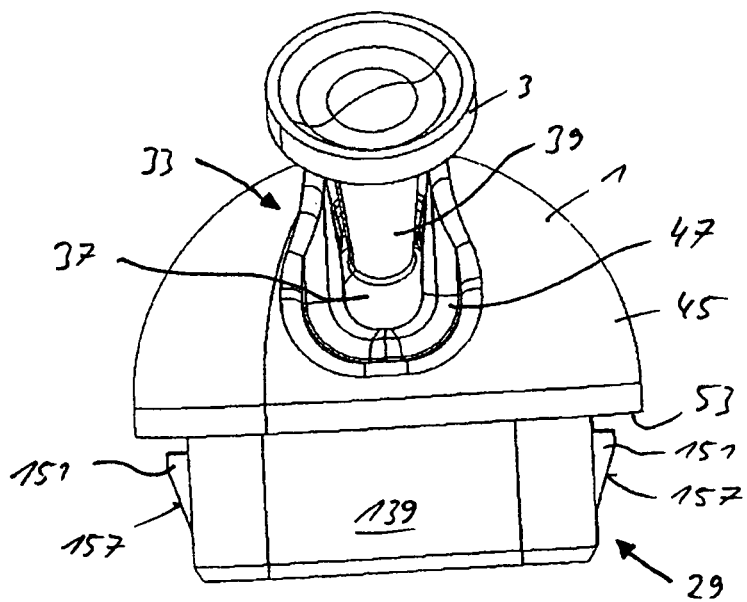
FIG. 50 is a side view from the rear of the joining element illustrated in FIG. 49.

FIGS. 47 and 48 show the joining element 1 completely fitted to the second component 5. As can be seen in FIGS. 45 to 48, the base 139 has two latching tongues 141 which each have a latching lug 143. For the fitting of the joining element 1, the base 139 and consequently the latching tongues 141 can slide along an essentially rectangular aperture 145 of the second component 5 in such a manner that the latching tongues 141 spring in, which is indicated in FIG. 48 by an arrow 147. In the fitted state, the latching tongues 141 are sprung out again such that their latching lugs 143 are in engagement with the lower side 25 of the second component 5, i.e. removal of the joining element 1 is not easily possible. The base 139 is matched in its external shape to the aperture 145 such that the base 139 is in bearing contact on an inner side with the aperture 145. It is apparent that the base 139 and the latching tongues 141 and their latching lugs 143 realize a connection 29 of the joining element 1 to the second component 5.

The joining element 1 is secured against rotational movements by the base 139 being inserted in a form-fitting manner into the base aperture 145. The joining element 1 is secured against being taken out of the base aperture 145 by the latching by means of the latching lugs 143.

Figure 51:
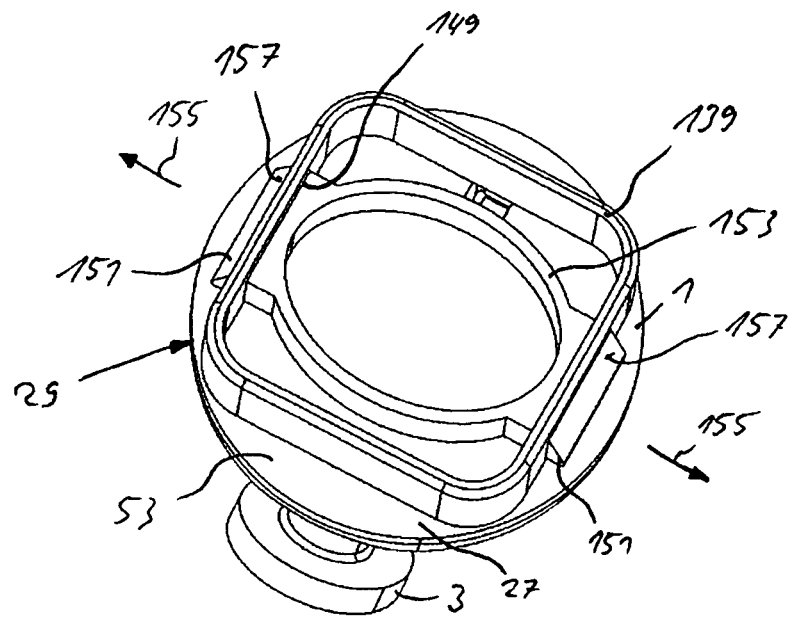
FIG. 51 is a perspective view, from below, of the joining element with the dome and the spring ring with two latches.
Figure 52:
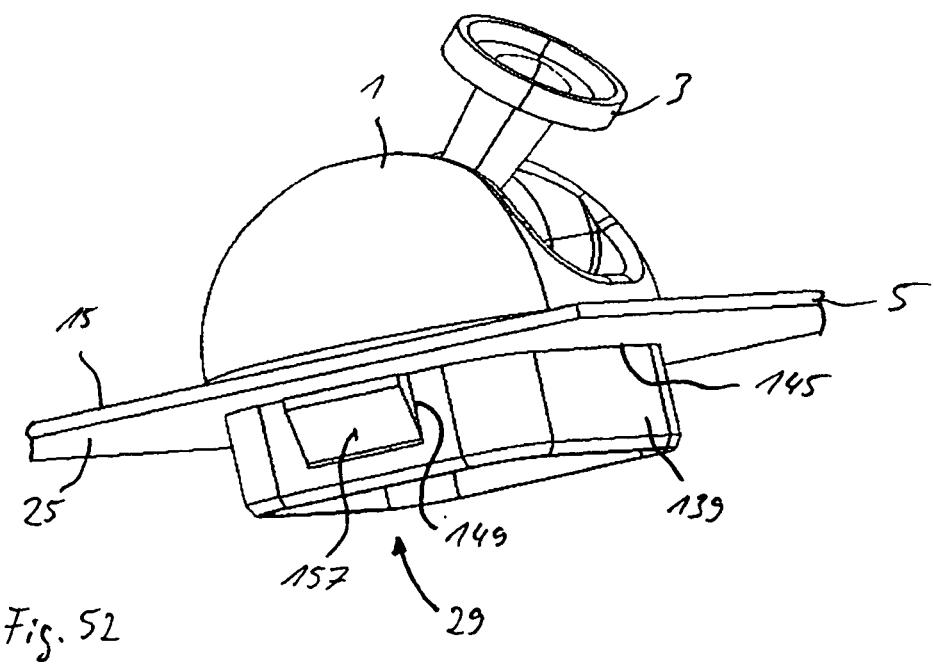
FIG. 52 is a perspective view, from the rear and below, of the joining element illustrated in FIGS. 49 to 51, in the fitted state with the second component.

FIGS. 49 to 52 show a further exemplary embodiment of a joining element 1 with a base 139. In contrast, the base 139 does not have any latching tongues. On the contrary, the base 139 has two opposite recesses 149 through which two locking catches 151 protrude. In FIG. 51 it is apparent that the locking catches 151 are connected to a spring ring 153. The spring ring 153 here brings about a spring force on the locking catches in the closing direction, as indicated in FIG. 51 by arrows 155. When the base 139 is fitted into the corresponding aperture 145 of the second component 5, the locking catches 151 can therefore spring in counter to the direction of the arrows 155 by means of oblique surfaces 157 striking against the aperture 145. In the fitted state, the locking catches 151 can spring out again. This state is shown in FIGS. 52 and 53, where it can be seen that the locking catches 151 fix the joining element 1 on the second component 5 analogously to the function of the previously described latching lugs 143 of the latching tongues 141.

Figure 53:
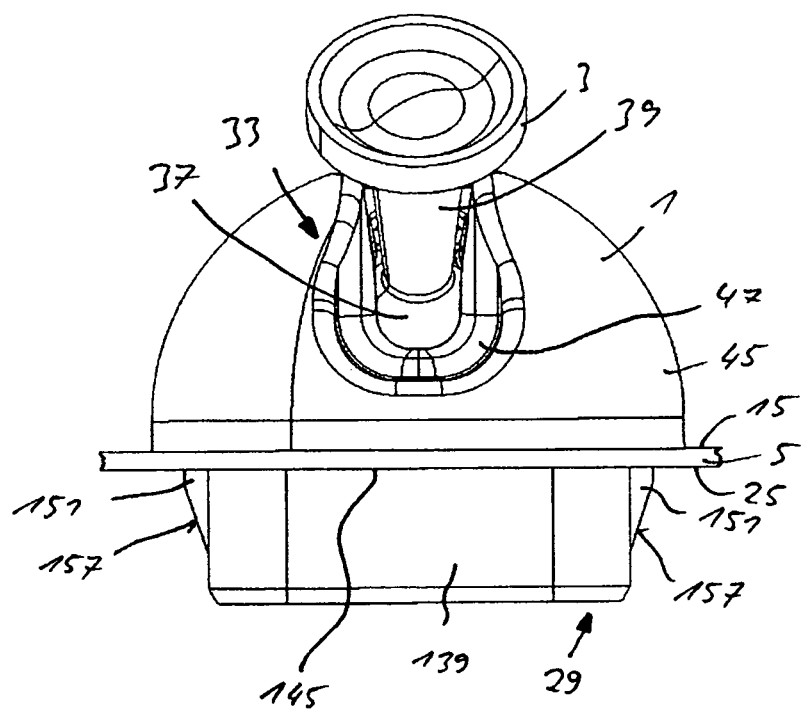
FIG. 53 is a side view, from the rear, of the joining element illustrated in FIG. 52, in the fitted state with the second component.

It is likewise apparent in FIGS. 52 and 53 that the locking catches 151 of the spring ring 153, the recesses 149 of the base 139, the base 139 and the stop surface 27 of the joining element 1 realize a connection 29 of the joining element 1 to the second component 5.

FIG. 54 shows a plan view of a further joining element 1. FIG. 55 shows a front view of the joining element 1 shown in FIG. 54. FIG. 56 shows a bottom view of the joining element 1 shown in FIGS. 54 and 55. FIG. 57 shows a longitudinal section of the joining element 1 shown in FIGS. 54 to 56, along the line A-A in FIG. 55. FIGS. 58 to 59 show the joining element 1 shown in FIGS. 54 to 57, obliquely from below and above.

The joining element 1 has a latching mechanism 159 with a spring element 161 for pre-stressing the latching lugs 31 which are visible in particular in FIGS. 56 to 58. The joining element 1 together with the connection 29 with the base 17 is designed analogously to FIGS. 1 to 10. In contrast, the latching lugs 31 are placed onto the spring element 161 and can spring in counter to a corresponding resetting force and, if appropriate, can spring out again.

The latching mechanism 159 has two parts which can be separated from the rest of the joining element 1, namely a latching slide 163 and the spring element 161 pre-stressing the latter. The latching slide 163 has two of the latching lugs 31 which protrude through apertures 165 of the base 17 of the joining element 1. The latching slide 163 has a sliding bearing 167 which is designed for the sliding, linear mounting of the latching slide 163 relative to the base 17 of the joining element 1. The sliding direction is indicated in FIG. 56 by a double arrow 169. The sliding bearing 167 has, in particular, two sliding ribs 171, with each of the latching lugs 31 having one of the sliding ribs 171 laterally on a longer upper side. The sliding ribs 171 are arranged such that they lie opposite one another on the latching lugs 31. For the mounting of the latching slide 163, the sliding ribs 171 each engage in a sliding groove 173, which is matched in a form-fitting manner, of the corresponding aperture 165 of the base 17.

The spring element 161 has two opposite, curved, interconnected spring leaves 175 and 177, thus resulting in an elliptical, convex shape. A first spring leaf 177 has a fastening rib 179 which can be pushed in a form-fitting manner into a fastening recess 181 matched to the shape of the fastening rib 179, for example as a press fit or loose fit. In order to fit the latch mechanism 159 in the base 17, the latching slide 159 or the latching lugs 31 with their sliding ribs 171 can first of all be inserted into the apertures 165 with their sliding grooves 173. The spring element 161, in a compressed, prestressed state, or the fastening rib 179 can then be pushed into the fastening recess 181.

It can be seen in FIG. 57 that a second spring leaf 175 of the spring element 161 has a fixing rib 183 with a double step 185. In the fitted state, as shown in FIG. 57, the double step 185 can engage in a form-fitting manner in a correspondingly matched recess 187 of the latching slide 163, with the spring element 161 being fixed against inadvertent removal on the latching slide 163 in a form-fitting manner. The latching slide 163 is secured via the sliding bearing 167, the direction of movement of which runs perpendicular to the fitting and direction of removal of the spring element 161.

It can be seen in FIG. 57 that the fastening rib 179 of the first spring leaf 177 of the spring element 161 merges on a side facing the joining element 1 into a fastening pin 189 which engages in or protrudes into a corresponding fastening hole 191 of the joining element 1. In order to limit the pushing-in movement of the spring element 161 into the base 17 of the joining element 1, the first spring leaf 177 of the spring element 161 has a stop rib 193 which can strike against a base side 195 of the base 17. The stop rib 193 strikes against the base side 195 in a final fitted position and therefore defines the latter, i.e. limits the fitting movement of the spring element 161 in the desired final fitted position.

FIGS. 54 to 59 depict the spring element 161 in a relaxed state, and therefore the latter, in a departure from an actually possible state, overlaps with the latching side 163.

Figure 66:
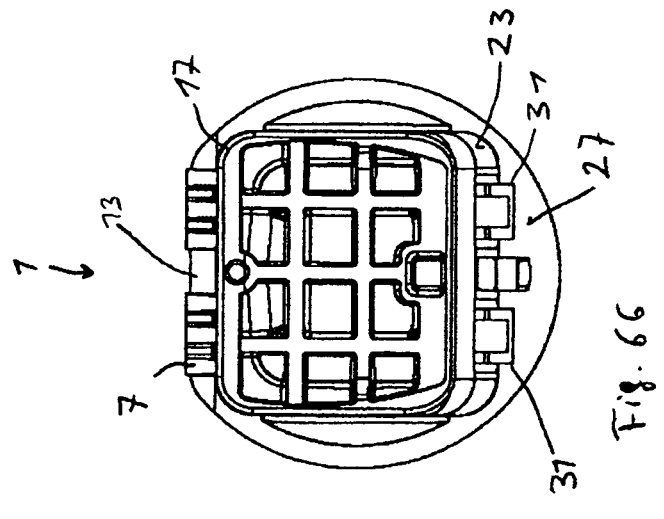
FIG. 66 is a bottom view of the joining element shown in FIGS. 60 to 65.
Figure 65:
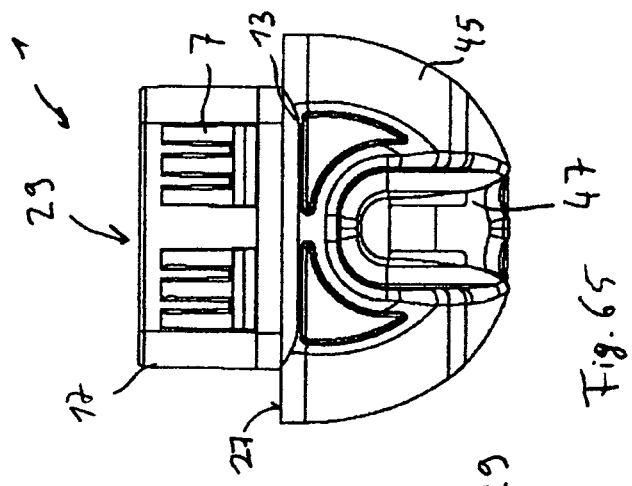
FIG. 65 is a front view of the joining element shown in FIGS. 60 to 64.
Figure 64:
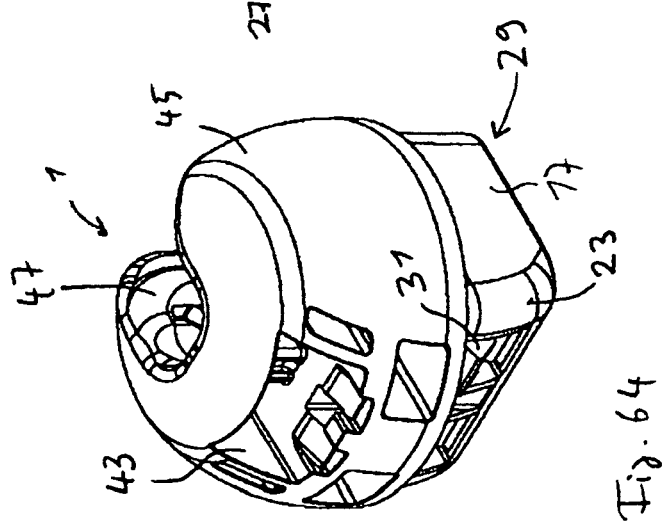
FIG. 64 is a perspective view of the joining element shown in FIGS. 60 to 63, from above.

FIG. 60 shows a rear view of a further joining element 1 with an integrated latching mechanism 197 with material joints 199. FIG. 61 shows a plan view of the joining element 1 shown in FIG. 60. FIG. 62 shows a cross section of the joining element 1 shown in FIGS. 60 and 61, along the line B-B in FIG. 60. FIG. 63 shows a longitudinal section of the joining element 1 shown in FIGS. 60 to 62, along the line A-A in FIG. 61. FIG. 64 shows a three-dimensional illustration of the joining element 1 shown in FIGS. 6Q to 63, obliquely from above. FIG. 65 shows a front view of the joining element 1 shown in FIGS. 60 to 64. FIG. 66 shows a bottom view of the joining element 1 shown in FIGS. 60 to 65.

The material of the material joints 199 can have elastic properties and is assigned as a single piece or integrally to the base 17 of the joining element 1 and to latching elements 201. As is apparent in FIGS. 60 and 64, the material joint is of L-shaped and planar design such that a U shape is produced together with the adjacent latching element 201. The two latching elements 201 with the connected material joints 199 form the two latching lugs 31 of the joining element 1. The latching element 201 is of wedge-shaped design and can be in engagement with a second component (not illustrated specifically in FIGS. 60 to 66) in order to latch the joining element 1 to the component. The resetting forces of the latching-in latching elements 201 of the latching lugs 31 are applied by the material joints 199. The material of the integral joining element 1, the shaping of the material joints 199 and/or the material thickness of the material joints 199 can be varied in order to set the resetting forces or the spring characteristic of the material joints 199.

In FIG. 60, the latching lugs 31 of the latching mechanism 197 are visible from the front. These latching lugs are located in rectangular apertures 203, with the material joints 199—as seen in the orientation of FIG. 1—each being connected at the bottom to the base 17 of the joining element 1. The latching elements 201 are mounted moveably within the apertures 203 via the material joints 199. For latching-in purposes, movements into the plane of the drawing of FIG. 1 are possible (counter to resetting forces of the material joints 199) and subsequently movements out of it are possible. In order to ensure the moveability of the material joints 199, a respective distance to the base 17 in the form of a gap 205 encircling in a U-shaped manner is X<provided between the material joints 199 and the latching elements 201 connected to them.

The latching mechanism 197 of the joining element 1 has a total of two material joints 199 with latching elements 201 connected thereto. It is possible to provide any other desired number of material joints 199 and associated latching elements 201, for example only one in each case or more than two.

In particular in the sectional illustrations of FIGS. 62 and 63 and in the bottom view of FIG. 66, it can be seen that the entire joining element 1 is advantageously composed of only one part which can be produced, for example, in an injection-moulding operation.

Figure 67:
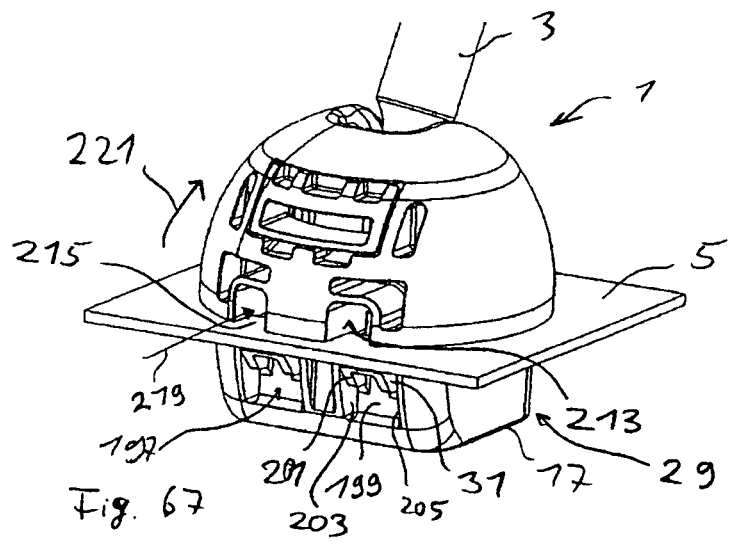
FIG. 67 is a perspective view of a further joining element with an actuating device for unlocking a latching mechanism.
Figure 68:
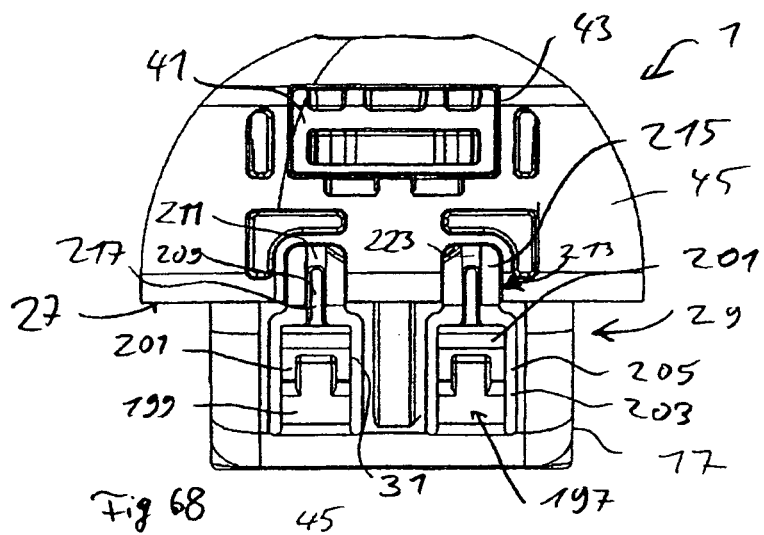
FIG. 68 is a rear view of the joining element shown in FIG. 67.
Figure 69:
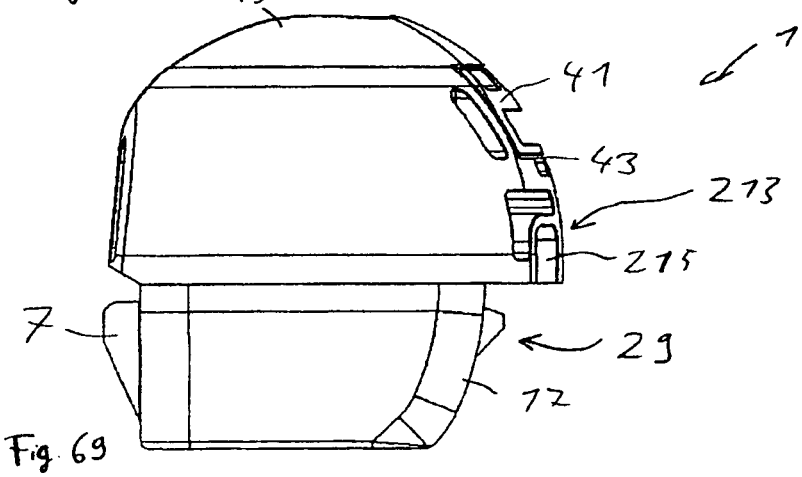
FIG. 69 is a side view of the joining element shown in FIGS. 67 and 68.
Figure 70:
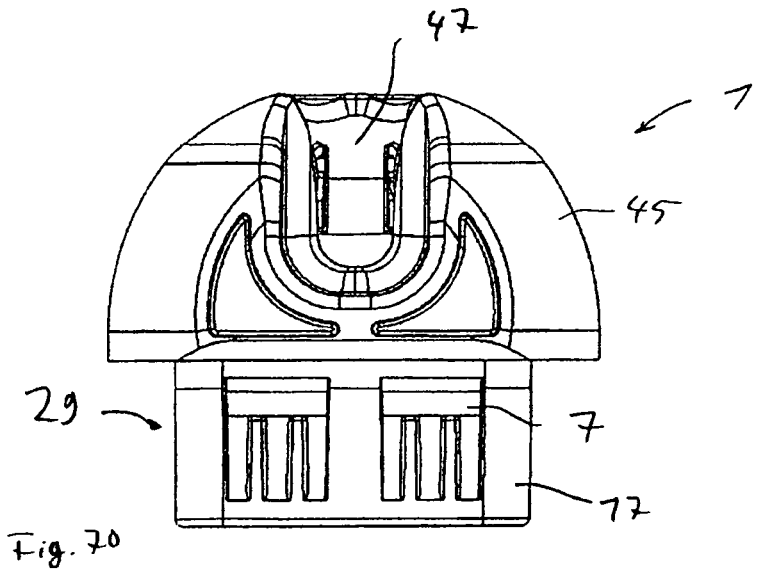
FIG. 70 is a front view of the joining element shown in FIGS. 67 to 69.
Figure 71:
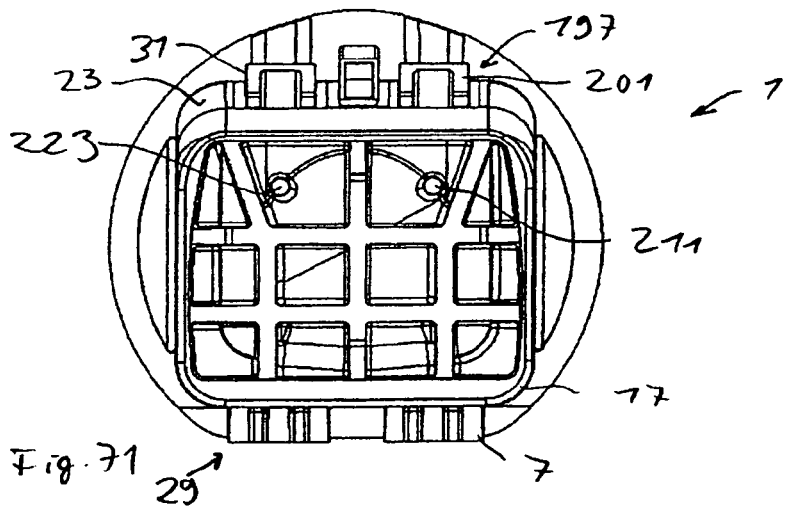
FIG. 71 is a bottom view of the joining element shown in FIGS. 67 to 70.
Figure 72:
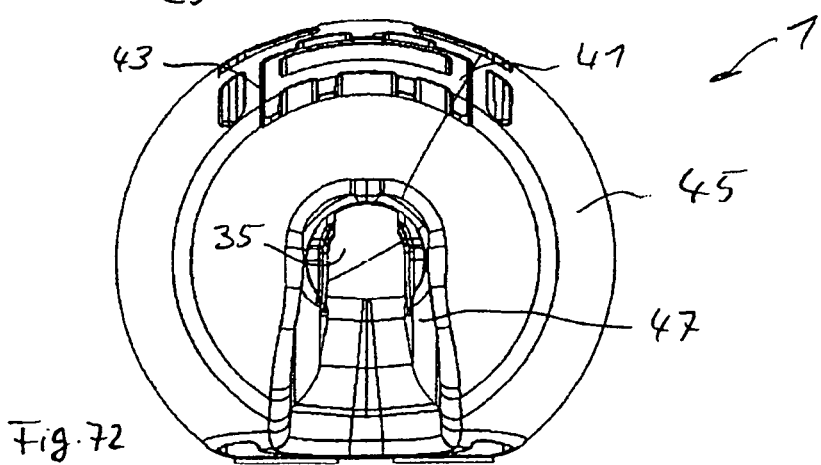
FIG. 72 is a plan view of the joining element shown in FIGS. 67 to 71.
Figure 73:
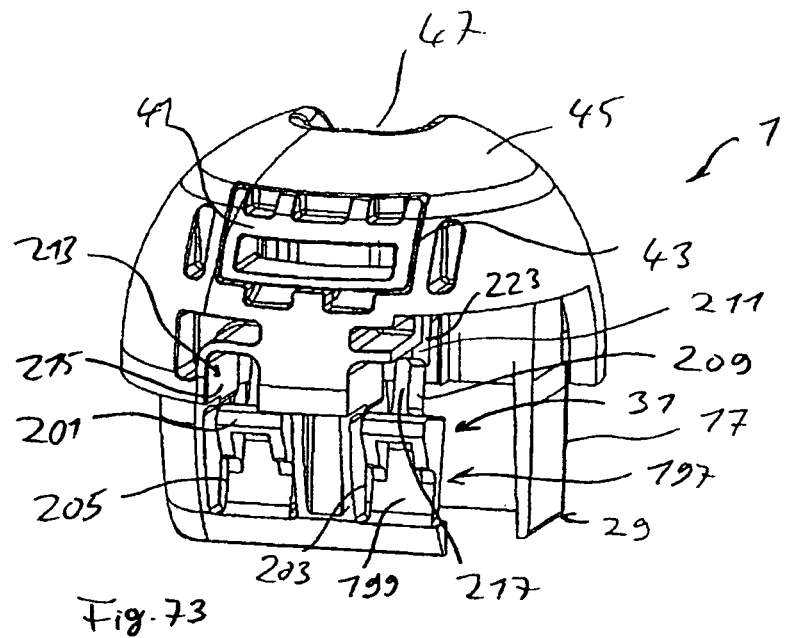
FIGS. 73 and 75 show various three-dimensional illustrations with a partial section of the joining element shown in FIGS. 67 to 72.
Figure 74:
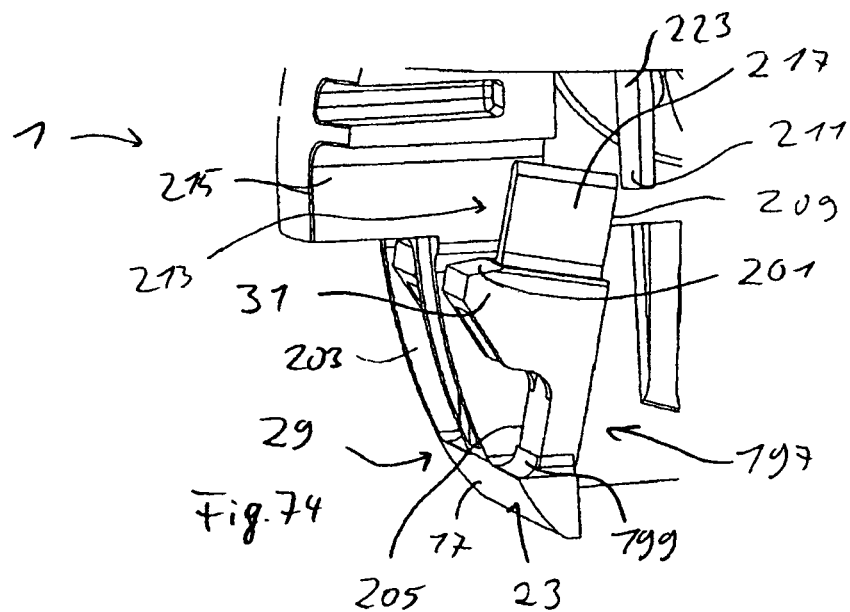
FIGS. 74 and 76 are perspective views of a detail of a latching lug with a stop of the joining element shown in FIGS. 73 and 75.
Figure 75:
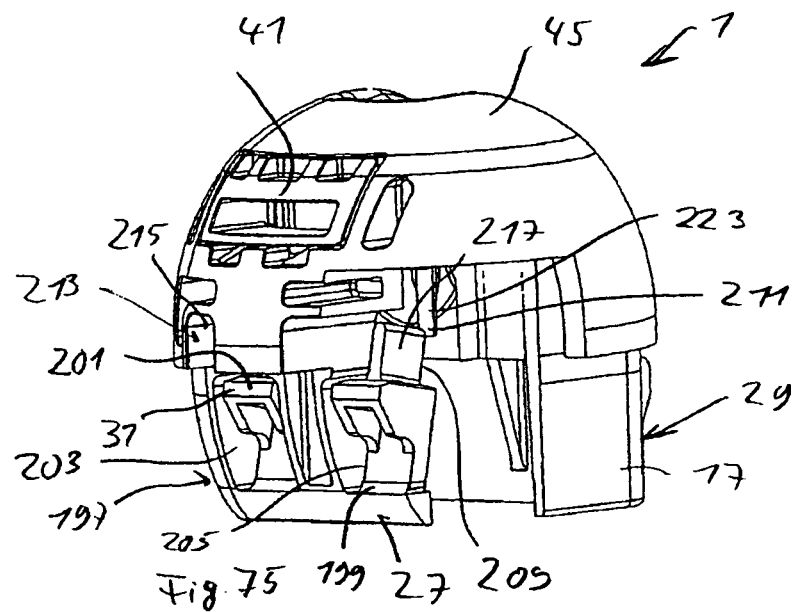
Figure 76:
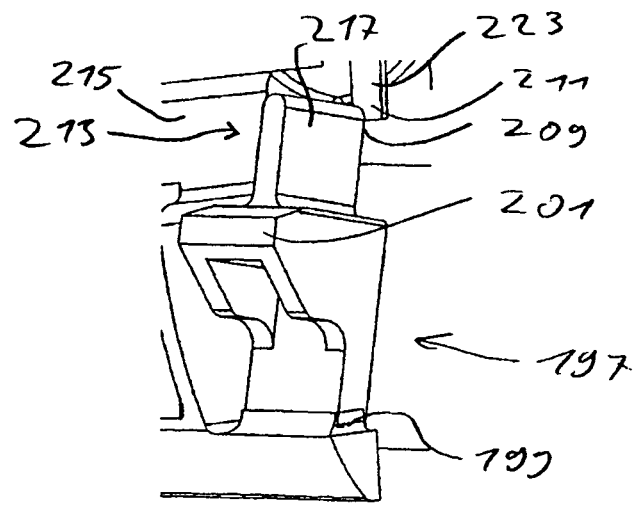
Figure 77:
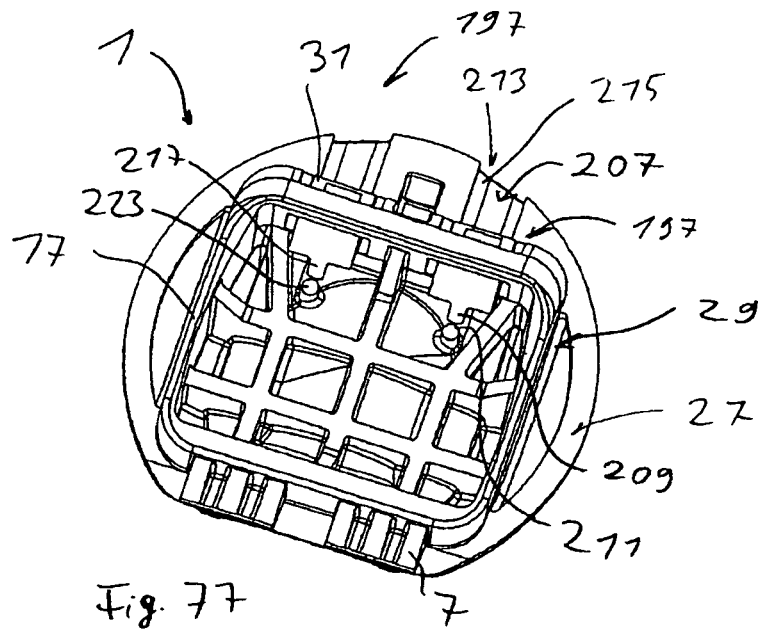
FIG. 77 is a perspective view, from below, of the joining element shown in FIGS. 67 to 76.
Figure 78:
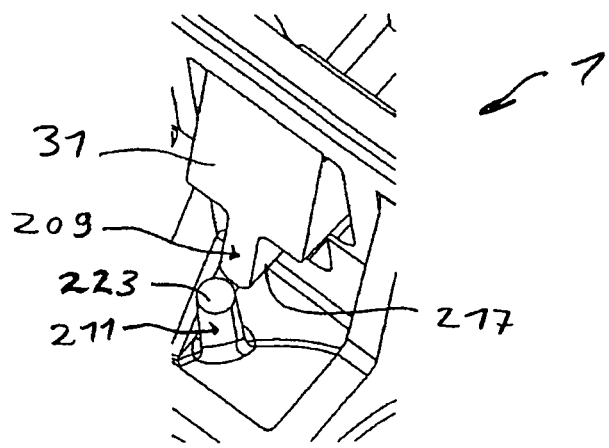
FIG. 78 is a perspective view of a detail with a counter stop interacting with the stop of the latching lug.
Figure 79:
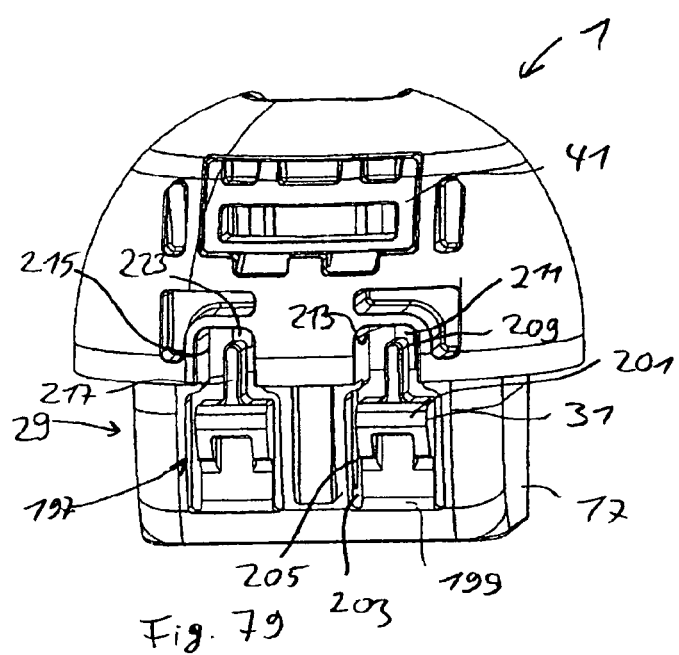
FIG. 79 is a perspective view, from the rear, of the joining element shown in FIGS. 67 to 78.

FIG. 67 shows a further joining element 1 with an actuating device 213 for unlocking a latching mechanism 197 with a material joint 199 analogous to the illustrations according to FIGS. 60 to 66. FIGS. 68 to 72 and 79 show further views of the joining element 1 illustrated in FIG. 67. FIGS. 73 and 75 show a partial cutaway of the joining element 1 illustrated in FIGS. 67 to 72. FIGS. 74 and 76 show details of a latching lug 31 with a stop 209 of the joining element 1. FIG. 77 shows, the joining element 1 from below. FIG. 78 shows a detail with a counter stop 211 which interacts with the stop 209 of the latching lug 31. The differences over the illustration according to FIGS. 60 to 66 will be discussed below.

The joining element 1 has an actuating device 213 for unlocking the latching mechanism 197. For this purpose, the actuating device 213 or the upper side 45 of the joining element 1 adjacent to the second component 5 has two actuating recesses 215. The actuating recesses 215 are designed as grooves, for example circa 4×4 mm in size, with the stops 209 of the latching lugs 31 engaging in the actuating recesses 215. As can readily be seen in FIGS. 67 and 68, an object coming from the outside can be introduced through the actuating recesses 215 in the direction of the interior of the joining element 1. This may be, for example, a tool of U-shaped configuration. In this case, the object or the tool comes into engagement with a respective rib 217 of the latching lugs 31 or the stops 209 of the latching lugs 31, with it being possible for the latching lugs 31 to be moved from a locking position into an unlocking position. In FIG. 67, this movement is indicated by an arrow 219. After this operation, the latching lugs 31 are no longer in engagement with the second component 5. The joining element 1 can be removed again from the second component 5 without being destroyed. To do this, it can be unscrewed counter to the fitting direction out of the recess 11 of the second component 5, which is indicated in FIG. 67 by a curved arrow 221.

The tool may be, for example, a screwdriver, a pair of pointed pliers, a plastic bridge or similar aid. In order to achieve an actuation which is as simple as possible, the ribs 217 may be enlarged in such a manner that they extend as far as possible in the direction of the exterior of the joining element 1, and therefore the tool has to be inserted to the smallest possible extent into the actuating recesses 215. The ribs 217 advantageously permit a good lever with regard to the material joints 199, thereby resulting in an actuating force which is as small as possible in order to release the latching mechanism 197.

As can be seen in particular with reference to the detail illustrations of FIGS. 76, 77 and 78, the illustrated rib 217 or the stop 209 with its rib 217 of the latching lug 31 can strike against the counter stop 211. This makes it possible for the latching lug 31 to move as far as the unlocking position and to be limited there. The material joint 199 can be protected against undesirable overloading or over-extension. The counter stop 211 has a pin 223 which is arranged such that it is assigned to or lies opposite the rib 217.

It is conceivable, by means of the action of the tool through the actuating recesses 215, to deflect the latching lugs 31 with the associated ribs 217 to an extent such that the pin 223 can no longer absorb the stop forces which occur and is deformed or even breaks off. This may also result in a breaking of the material joint 199. In this case, the joining element 1 can likewise be removed as described above, advantageously even after the tool is removed from the actuating recesses 215. As a result, the latching mechanism 197 is irreversibly destroyed, but can advantageously be released more easily and rapidly for simpler removal of the joining element 1. In order to permit a controlled and/or earlier breaking, the pin 223 and/or the material joint 199 can have a predetermined breaking point.

Figure 80:
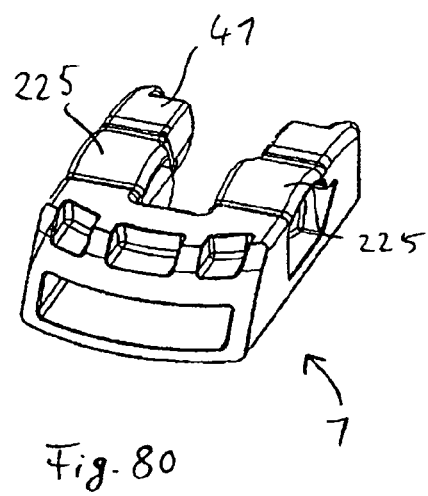
FIG. 80 shows a clamp of the joining element shown in FIGS. 67 to 78.
Figure 81:
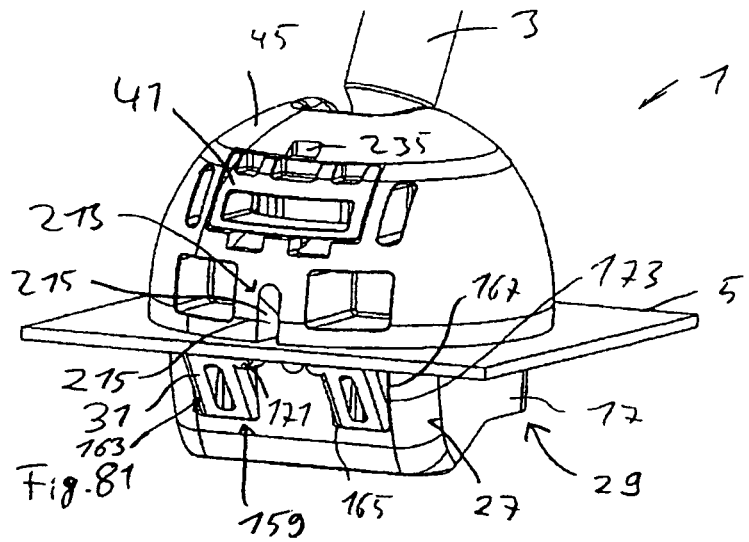
FIG. 81 is a perspective of a further joining element with an actuating device for unlocking a latching mechanism.
Figure 82:
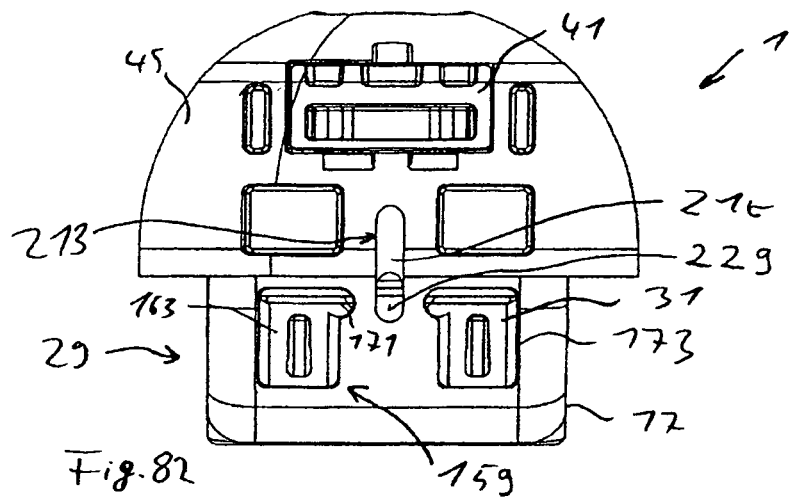
FIG. 82 is a rear view of the joining element shown in FIG. 81.
Figure 83:
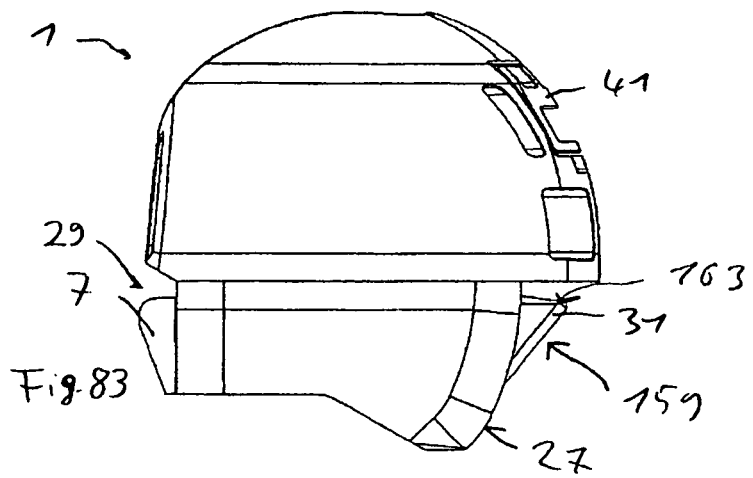
FIG. 83 is a side view of the joining element shown in FIGS. 81 and 82.
Figure 84:
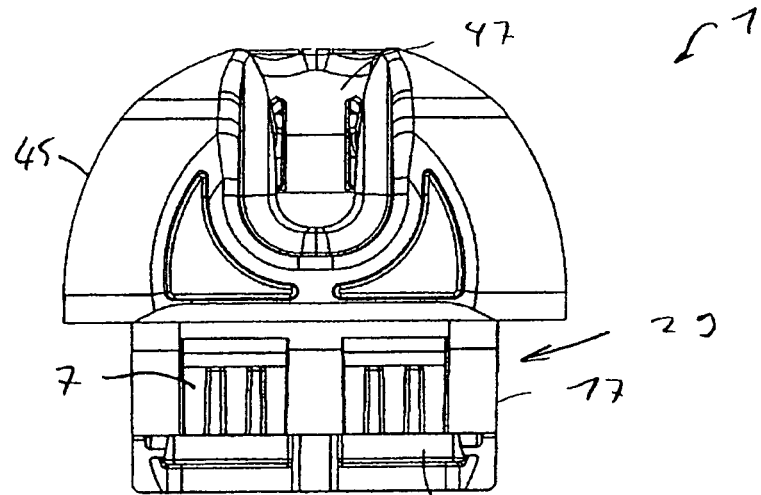
FIG. 84 is a front view of the joining element shown in FIGS. 81 to 83.
Figure 85:
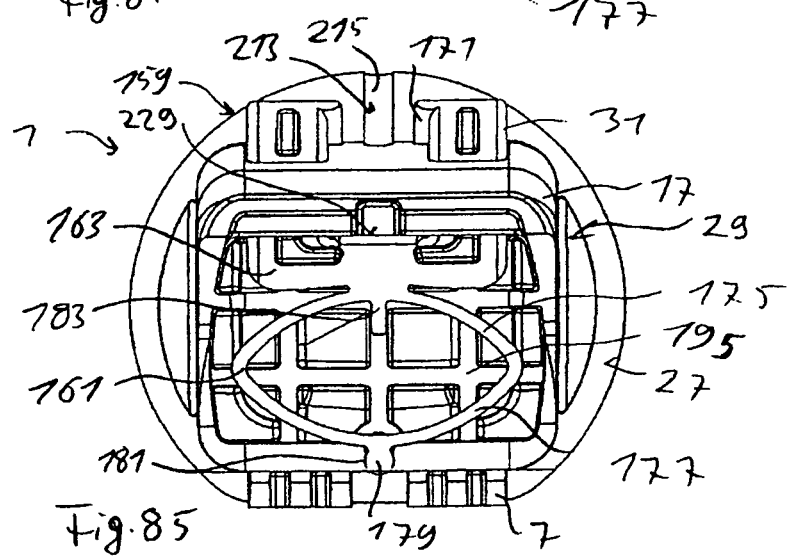
FIG. 85 is a bottom view of the joining element shown in FIGS. 81 to 84.
Figure 86:
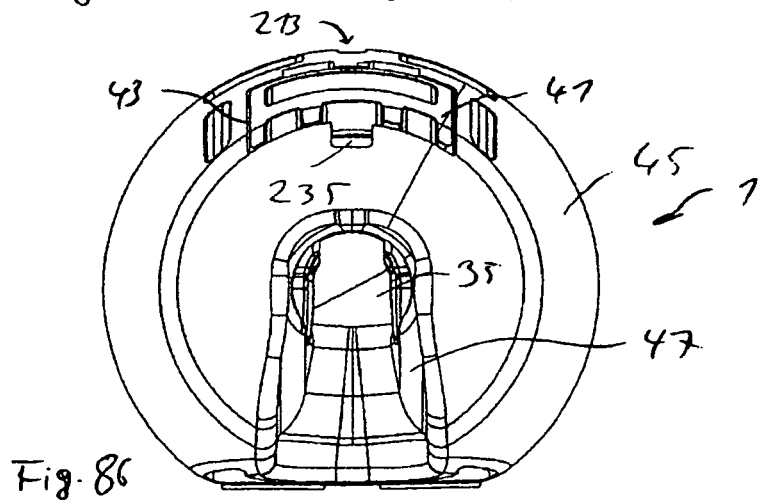
FIG. 86 is a plan view of the joining element shown in FIGS. 81 to 85.

FIG. 80 shows a clamp 41 of the joining element 1 shown in FIG. 67 to 79. The clamp 41 has two spring bridges 225 and can be fixed in a frictional and/or form-fitting manner in a recess 43 of the joining element 1 shown in FIGS. 67 to 79. In this case, the clamp 41 for the fixing of the first component 3 can be held by the resetting forces of the spring bridges 225 in the recess 43 which can have corresponding bearing surfaces matched to the shape of the spring bridges 225. In order to release the first component 3 from the joining element 1, the clamp 41 can be pulled out of the recess 43 with a pair of pliers (not illustrated specifically). For this purpose, the clamp 41 can have recesses which form bearing surfaces for the pair of pliers for grasping the clamp 41, with it being possible for the pair of pliers for grasping the clamp 41 to engage in the recesses.

Figure 87:
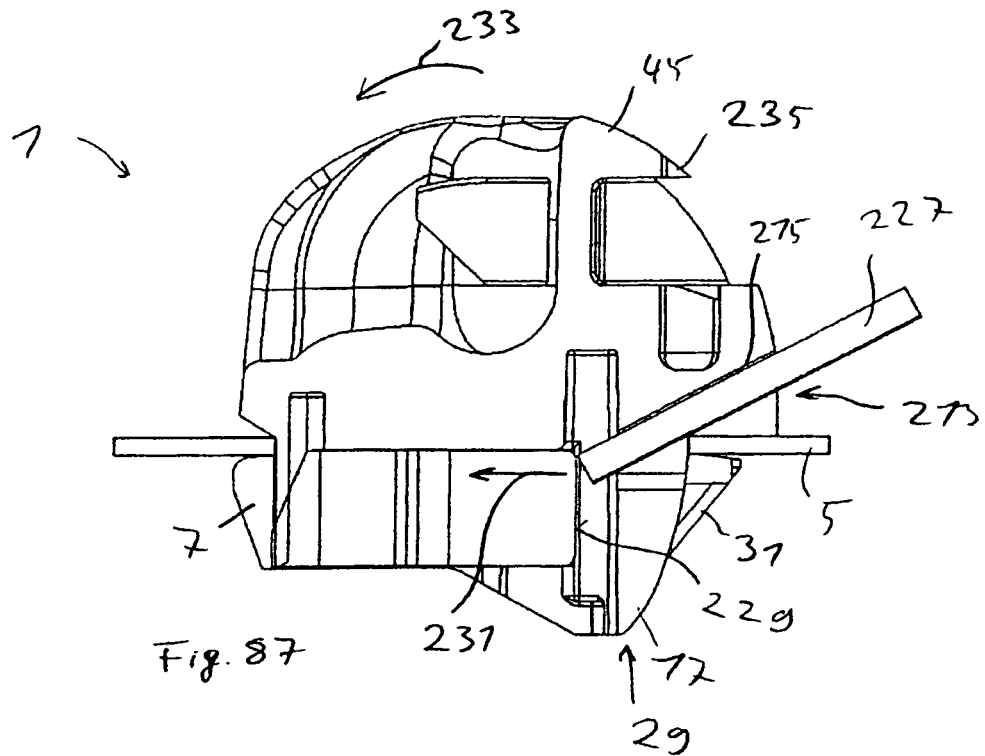
FIG. 87 is a sectional view of the joining element shown in FIGS. 81 to 86, together with a stick for unlocking a latching mechanism.
Figure 88:
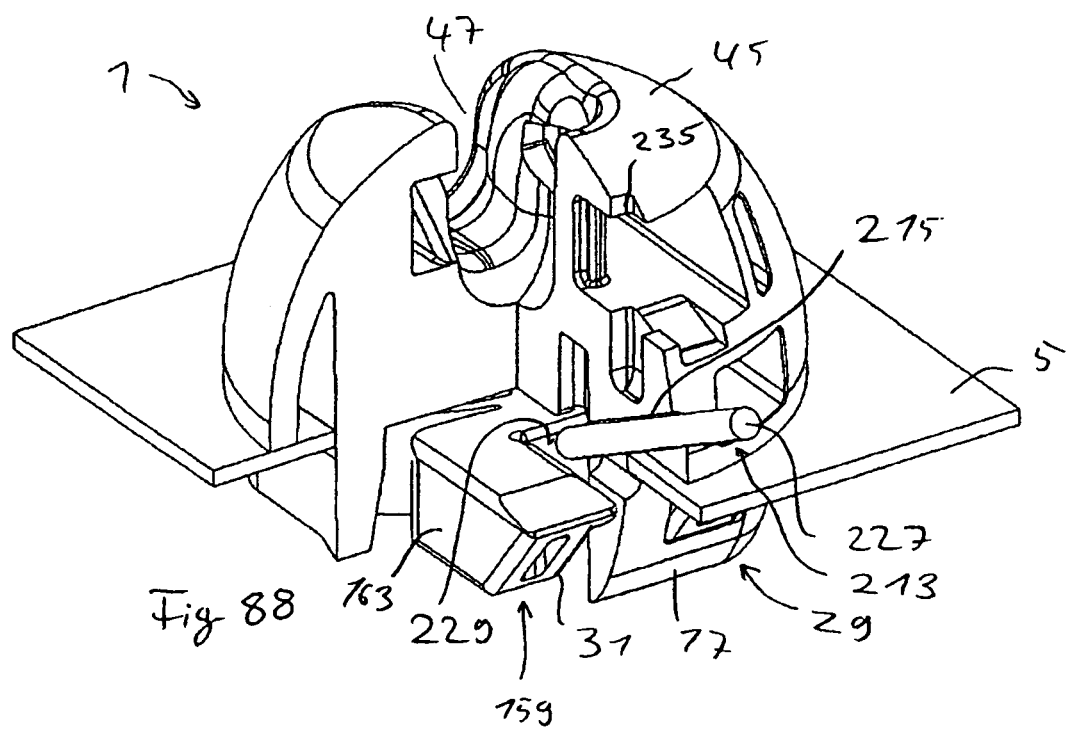
FIG. 88 is a perspective partial sectional view, from above, of the joining element shown in FIGS. 81 to 87 together with the stick for unlocking the latching mechanism.

FIGS. 81 to 86 show various views of a further joining element 1 analogous to the joining element 1 according to FIGS. 54 to 59. FIG. 87 shows a sectional view of the joining element 1 shown in FIGS. 81 to 86, together with a stick 227 for unlocking a latching mechanism 159 with a spring element 161. FIG. 88 shows a partial sectional view of the joining element 1 shown in FIGS. 81 to 87, together with the stick 227 for unlocking the latching mechanism 159.

The joining element 1 illustrated in FIGS. 81 to 88 likewise has an actuating device 213. In contrast, the actuating device 213 only has a centrally arranged actuating recess 215. As illustrated in FIGS. 87 and 88, the stick 227 can be pushed through the actuating recess 213 and obliquely through the recess 11 of the second component 5 in the direction of the latching slide 163 of the latching mechanism 159. The stick 227 can be pushed in until it strikes against a stop surface 229 of the latching slide 163 of the latching mechanism 159 and, as a result, moves the latching slide counter to the closing direction into an open position. This operation is indicated in FIG. 87 by an arrow 231. By means of the stick 227, the latching lugs 31 can be moved via the latching slide 163 in the direction of the arrow 231 until they are no longer in engagement with the second component 5, i.e. release the joining element 1. The stick 227 can have, for example, a diameter of 2 mm. For removal purposes, the joining element 1 can then be unscrewed from the recess 11 of the second component 5 without being destroyed, which is indicated by a curved arrow 233 in FIG. 87.

The joining element 1, as shown in FIGS. 81 to 88, has an opening 235 in the region above the shaft 43. Said opening can serve as a stop for a latching hook (not illustrated specifically) of the clamp 41.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A joining element for connecting a first component to a second component having at least one aperture, the joining element comprising:
   a connection member for the pivotable mounting of the first component, wherein part of the connection member is receivable in said at least one aperture in a predetermined orientation;
   a fixing mechanism for directly fixing the connection member to the second component when said part of the connection member is received in said at least one aperture;
   an actuating device configured to unlock the fixing mechanism; and
   an actuating recess arranged in the connection member for accessing the actuating device to release the fixing mechanism from engagement with the second component.

2. The joining element of claim 1 wherein the connection member comprises a ball socket which receives a ball of the first component.

3. The joining element of claim 2 further comprising a clamp which can be pushed into a recess in the connection member for fixing the ball in the ball socket.

4. The joining element of claim 1 wherein the connection member comprises a base which is received in an aperture of the second component in a form-fitting manner.

5. The joining element of claim 4 wherein the base has a rectangular profile and can be inserted into an essentially rectangular aperture of the second component.

6. The joining element of claim 4 wherein the fixing mechanism comprises a fixed latch on one side of the base and a resilient latch on a side of the base opposite from the fixed latch.

7. The joining element according to claim 6, wherein the side of the base which lies opposite the from fixed latch has a curved sliding surface which permits engaging the fixed latch to the second component and pivoting the base into the aperture as the resilient latch engages the second component.

8. The joining element of claim 6 wherein the resilient latch comprises a latching slide with two resilient latching lugs, a sliding bearing for the mounting of the latching slide, and a spring element which loads the latching slide toward a latched position.

9. The joining element of claim 8 wherein the resilient latch comprises a pair of lugs, the connection member having a central actuating recess for accessing both of said lugs from above said second component to release the lugs from engagement with the second component.

10. The joining element of claim 6 wherein the resilient latch comprises at least one lug formed as one piece with the base and connected to the base by a resilient material joint.

11. The joining element of claim 10 wherein each said lug has an extension which can be accessed from above the second component to release the lug from engagement with the second component.

12. The joining element of claim 10 wherein the extension acts as a stop, the connection member having at least one counter stop which limits travel of a respective said stop.

13. The joining element of claim 10 wherein each said material joint has a breaking point which permits destructive over-pressing of the latching lug.

14. The joining element of claim 4 wherein the fixing mechanism comprises a spring ring with a pair of resilient catches which protrude from opposite sides of the base.

15. The joining element of claim 1 wherein the connection member has an aligning pin for aligning the joining element relative to the second component, the aligning pin being receivable into an aligning hole of the second component.

16. The joining element of claim 1 wherein the body has at least one expanding mechanism and at least one respective fixing stem, said at least one expanding mechanism being receivable into at least one fixing hole of the second component and being radially expandable by inserting the fixing stem into the expanding mechanism.

17. The joining element of claim 1 wherein the connection member comprises two sliding shoes which can be inserted into respective tapered slots of the second component, and slid in the slots to connect the connection member to the second component.

18. The joining element of claim 11 wherein the connection member has at least one latching peg which can engage in a latching aperture of the second component to lock the connection.

19. The joining element of claim 1 wherein the fixing mechanism comprises a pair of clips which are fitted to the connection member in a form-fitting manner, the clips being receivable in corresponding clip holes of the second component.

20. The joining element of claim 19 wherein the connection member has a pair of aligning pegs which are receivable in corresponding aligning holes in the second component.

21. The joining element of claim 1 wherein the fixing mechanism a pair of expanding mechanisms which can be inserted into fixing apertures of the second component, and a pair of expanding stems on the connection member, the stems being insertable into the expanding mechanisms to expand the mechanisms radially and fix the connection member to the second component.

22. The joining element of claim 1 wherein the fixing mechanism comprises a gripping shoe on the connection member for engaging in a gripping aperture of the second component, and U-shaped clip on the body for clipping into a clip recess of the second component.

23. The joining element of claim 1, further comprising a rib configured to move the actuating device so that the fixing mechanism moves from a locking position into an unlocking position.

* * * * *